United States Patent
Le Bars et al.

(10) Patent No.: US 12,244,419 B2
(45) Date of Patent: Mar. 4, 2025

(54) METHOD FOR PDCP NETWORK CODING IN 5G-RAN OR 4G E-UTRAN

(71) Applicant: CANON KABUSHIKI KAISHA, Tokyo (JP)

(72) Inventors: Philippe Le Bars, Thorigné-Fouillard (FR); Pascal Lagrange, La Chapelle des Fougeretz (FR); Pierre Visa, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 17/926,092

(22) PCT Filed: May 18, 2021

(86) PCT No.: PCT/EP2021/063177
§ 371 (c)(1),
(2) Date: Nov. 17, 2022

(87) PCT Pub. No.: WO2021/233929
PCT Pub. Date: Nov. 25, 2021

(65) Prior Publication Data
US 2023/0188257 A1 Jun. 15, 2023

(30) Foreign Application Priority Data
May 20, 2020 (GB) ..................................... 2007548

(51) Int. Cl.
*H04L 1/00* (2006.01)
*H04L 47/34* (2022.01)
(52) U.S. Cl.
CPC ............ *H04L 1/0076* (2013.01); *H04L 47/34* (2013.01); *H04L 2212/00* (2013.01)
(58) Field of Classification Search
CPC ... H04L 1/0076; H04L 47/34; H04L 2212/00; H04L 1/0075; H04L 1/06; H04L 1/0041
See application file for complete search history.

(56) References Cited

U.S. PATENT DOCUMENTS

| 7,359,403 B1 * | 4/2008 | Rinne ..................... H04L 69/32 370/476 |
| 2005/0213605 A1 * | 9/2005 | Kim ....................... H04W 28/06 370/310 |

(Continued)

FOREIGN PATENT DOCUMENTS

WO     2017171919 A1    10/2017

OTHER PUBLICATIONS

Apple, pCR: Update for solution#9[online], 3GPP TSG SA WG3 #97 S3-194698, Internet<URL:https://www.3gpp.org/ftp/tsg_sa/WG3_Security/TSGS3_97_Reno/Docs/S3-194698.zip>, Nov. 22, 2019.

(Continued)

*Primary Examiner* — Christine Ng
(74) *Attorney, Agent, or Firm* — Canon U.S.A., Inc. IP Divsion

(57) ABSTRACT

There is provided a method of wireless transmission of protocol data units over one or more radio link modules, the method comprising:
splitting a service data unit, received from an upper layer, into a plurality of data packets;
obtaining combined data packets, by applying a Network Coding to the data packets, wherein padding is added, if necessary, to the service data unit or to data packets to have data packets of equal length to which is applied the Network Coding;
encapsulating the combined data packets into at least one protocol data unit, wherein each protocol data unit comprises a header and wherein the header contains a padding indication for indicating whether padding has been added or not, and
transmitting the at least one protocol data unit over the one or more radio link modules.

6 Claims, 17 Drawing Sheets

(56) References Cited

U.S. PATENT DOCUMENTS

| | | | |
|---|---|---|---|
| 2008/0101408 A1* | 5/2008 | Jiang | H04W 28/06 |
| | | | 370/470 |
| 2009/0010278 A1* | 1/2009 | Torsner | H04L 1/0007 |
| | | | 370/466 |
| 2009/0044067 A1* | 2/2009 | Obuchi | H04L 1/1845 |
| | | | 714/748 |
| 2016/0308776 A1 | 10/2016 | Ozturk | |
| 2017/0367007 A1* | 12/2017 | Sirotkin | H04W 12/033 |
| 2018/0212713 A1 | 7/2018 | Yu | |
| 2019/0230736 A1* | 7/2019 | Quan | H04W 28/06 |
| 2019/0386774 A1 | 12/2019 | Zhang | |
| 2021/0329644 A1* | 10/2021 | Zhou | H04W 76/27 |
| 2022/0376710 A1* | 11/2022 | Xu | H04L 1/0045 |

OTHER PUBLICATIONS

Intel Corporation, Intel Views on Release-17[online], 3GPP TSG RAN #84 RP-191406, Internet<URL:https://www.3gpp.org/ftp/tsg_ran/TSG_RAN/TSGR_84/Docs/RP-191406.zip>, Jun. 6, 2019.

Intel Corporation, Network coding for Release 17 IAB[online], 3GPP TSG RAN #85 RP-192206, Internet<URL:https://www.3gpp.org/ftp/tsg_ran/TSG_RAN/TSGR_85/Docs/RP-192206.zip>, Sep. 30, 2019.

Toward One symbol Network Coding Vectors; Thomos, Nikolaos, et al.; IEEE Communications Letters; vol. 16, No. 11, Nov. 2012; pp. 1860-1863.

Random Linear Network Coding for 5G Mobile Video Delivery; Vukobratovic Dejan, et al.; MDPI; Version Apr. 4, 2018 submitted to Information; www.mdpi.com/journal/information; pp. 1-20.

* cited by examiner

PDCP configuration
TS38.331 (p.237) ETSI edition

PDCP-Config field descriptions

*pdcp-NetworkCodingConfig*
Indicates whether or not Network Coding is to be applied to PDCP PDUs handled by the PDCP entities

| Conditional Presence | Explanation |
|---|---|
| *NetworkCodingCoefficients* | Network Coding coefficients to be used for both primary cell group and secondary cell groups |
| *NetworkCodingBearerConfig* | Indicates odd/even/comb1/comb2 partitioning between primary cell group and secondary cell groups |

Fig. 10

METHOD FOR PDCP NETWORK CODING IN 5G-RAN OR 4G E-UTRAN

CROSS-REFERENCE TO RELATED APPLICATIONS

This application is the National Phase application of PCT Application No. PCT/EP2021/063177, filed on May 18, 2021 and titled "METHOD FOR PDCP NETWORK CODING IN 5G-RAN OR 4G E-UTRAN". This application claims the benefit under 35 U.S.C. § 119(a)-(d) of United Kingdom Patent Application No. 2007548.7, filed on May 20, 2020 and entitled "METHOD FOR PDCP NETWORK CODING IN 5G-RAN OR 4G E-UTRAN". The above cited patent applications are incorporated herein by reference in their entireties.

FIELD OF THE INVENTION

The present invention relates generally to wireless communication networks and more specifically to 3GPP cellular communication networks (either 5G-RAN or 4G E-UTRAN). In particular, the present invention relates to mobiles, and more particularly to 5G Radio Access Networks (RAN), when it is used for communications with Industrial Internet of Things devices.

BACKGROUND OF THE INVENTION

Some cellular communication networks capable of providing telecommunications services are today governed by specifications defined by the $3^{rd}$ Generation Partnership Project (3GPP). The latest release tackles the $5^{th}$ generation of 3GPP standardized network, which is today the subject of a great deal of interest.

New generation communication network services, also qualified as Ultra Reliable Low Latency Communication (URLLC), aim at minimizing packet loss ratio and network latency.

In particular, these communication networks and compatible user equipment shall ensure an admitted packet loss ratio less than $10^{-5}$ (i.e. the probability of the failure of the transmission is less than 1 on 100 000.

Further, these communication networks and compatible user equipment shall also ensure an acceptable latency less than 1 ms. It is recalled that the end-to-end latency is defined as the time required for transmitted data to travel between for example a User Equipment (UE) and a server. In other words, the latency is the time required to convey data from a source in the communication network to a destination in the communication network.

Consequently, such 5G communication network would benefit from the implementation of transmission schemes enabling the packet loss ratio to be reduced. The packet loss reduction thus enables the latency of the network to be reduced by avoiding the resending of packets.

As known, in these cellular networks, exchanged data between two radio communicating devices of the network, pass through a Radio Bearer. Each Radio Bearer corresponds to a particular use of resources of the cellular network implementing a protocol stack. The protocol stack comprises several layers, such as the Radio Link Control (RLC) layer and the Packet Data Convergence Protocol (PDCP) layer, implemented in associated modules.

The Radio Bearer may involve one or several RLC modules configured to transmit data over associated legs, each leg defining a data transmission path between two communicating devices.

When a Radio Bearer comprises more than one leg, the transmission paths of the Radio Bearer may all be using the same base station of the communication network. Such a Radio Bearer still comprises several RLC modules, and therefore legs, defining different transmission paths associated with different frequency carriers handled by the same base station. The Radio Bearer may be using two or more base station of the communication network. Such a Radio Bearer still comprises several RLC modules, and therefore legs, defining different transmission paths associated with different frequency carriers handled by the different base stations. This Radio Bearer is then called a split radio bearer.

The multiplication of transmission paths provided by a Radio Bearer, as described hereinbefore, is used in different mechanisms to reduce packet loss of the network.

It may be used in a retransmission mechanism as defined in the Radio Access Network (RAN) specifications. The packet retransmission may be requested by a RLC module on the receiving path of the Radio Bearer when a packet is missing. Although it enables packet loss ratio to be improved, the retransmission time is detrimental to the latency. It is therefore not recommended to use such a mechanism in a 5G network to achieve tight latency requirement.

Furthermore, the duplication mechanism may be used, as defined in 3GPP specification TS38.323. The duplication mechanism involves duplicating a data packet and sending the original data packet and the duplicated data packet over two different legs of a Radio Bearer. Such a mechanism relies on two RLC modules at the user equipment defining two paths, or legs, passing through either the same base station or two different base stations. An example of implementation of duplication within a 5G network is illustrated in US2018/0279168.

One drawback of the duplication mechanism is that it increases the overhead, i.e. increase of the radio resource requirement in relation with the number of duplications, as well as protocol complexity.

Consequently, although the duplication is a reliable solution, it may be necessary to develop an alternative correcting scheme, ensuring the network communication to be more reliable while reducing the overhead.

SUMMARY OF THE INVENTION

The present invention offers a new kind of diversity consisting of using network coding by modifying as little as possible the existing specifications of the network. In particular, the code is adapted to 5G NR Ultra Reliable Low Latency Communication (URLLC) applications, enabling an improved robustness to data loss with a low impact on the latency of the communication network.

The present document relates to method of wireless transmission of protocol data units over one or more radio link modules, the method comprising:
splitting a service data unit, received from an upper layer, into a plurality of data packets;
obtaining combined data packets, by applying a Network Coding to the data packets, wherein padding is added, if necessary, to the service data unit or to data packets to have data packets of equal length to which is applied the Network Coding;
encapsulating the combined data packets into at least one protocol data unit, wherein each protocol data unit comprises a header and wherein the header contains a padding indication for indicating whether padding has been added or not, and transmitting the at least one protocol data unit over the one or more radio link modules.

In the invention, the coded packets are transmitted without the need of transmitting an additional signalization inserted in standard packets. In another aspect, the invention accommodates to the various sizes of data to be transmitted. Besides, the Network Coding scheme can be implemented at the PDCP layer of cellular networks enabling the obtained coded packets to be distributed over several transmission paths (several legs of a given Radio Bearer or several frequency carriers), so as to increase over the spatial and frequency diversity as well as the diversity on redundancies. This method therefore takes advantage of the multiplicity of the RLC layers following the PDCP layer.

According to some embodiments, the transmission may be performed over a plurality of radio link modules and wherein the splitting is performed into a number of data packets equal to the number of radio link modules.

According to some embodiments, the step of obtaining combined data packets may further comprise:
  obtaining a set of coefficients;
  calculating, in a Galois Field, the combined data packets as linear combinations of the plurality of data packets and the obtained set of coefficients.

According to some embodiments, the method may further comprise:
  associating each protocol data unit with a sequence number.

According to some embodiments, the sequence number may comprise an indication about the service data unit from which the protocol data unit is issued.

According to some embodiments, the sequence number may comprise an indication on coefficients of the set of coefficients used during the network coding of at least one combined data packet of the protocol data unit.

According to some embodiments, the step of encapsulating may further comprise:
  in each protocol data unit, adding the associated sequence number in the header of the protocol data unit.

Additionally, the present document provides a method of wireless transmission of protocol data units over one or more radio link modules, the method comprising:
  splitting a service data unit, received from an upper layer, into a plurality of data packets;
  encoding the data packets by applying Network Coding in order to obtain combined data packets, each combined data packet being associated with an identifier linked to the applied Network Coding;
  encapsulating the combined data packets into protocol data units, wherein each protocol data unit comprises a header comprising a sequence number associated with the protocol data unit;
  transmitting the protocol data units over the one or more radio link modules, and
  wherein the sequence number and the identifier are linked by a predetermined function.

With this method, the coded packets are transmitted without the need of transmitting an additional signalization inserted in standard packets. The predetermined function that links the sequence number and the identifier makes it possible to retrieve the coefficients used for the Network Coding of the service data unit without using any signalling. Therefore, this method helps not to increase the overhead.

According to some embodiments, the predetermined function may be transmitted over the one or more radio link modules.

According to some embodiments, said plurality of radio link modules may be handled by one same base station.

According to some embodiments, Carrier Aggregation may be used.

According to some embodiments, said plurality of radio link modules may be handled by several base stations.

According to some embodiments, Multi connectivity may be used.

According to some embodiments, the method may be implemented at a Packet Data Convergence Protocol sublayer and wherein the one or more radio link modules are radio link control modules according to 3GPP standard.

The present document also relates to a method of wireless reception of protocol data units, the method comprises:
  receiving protocol data units from one or more radio link modules, wherein each protocol data unit comprises a header comprising a padding indication associated with the protocol data unit;
  de-encapsulating, from the received protocol data units, combined data packets obtained by applying a Network Coding at an encoder, wherein each combined data packet is associated with a padding indicator;
  obtaining padding indicator of the combined data packets based on the padding indication;
  obtaining data packets by applying Network Decoding on the combined data packets;
  removing padding from the obtained data packets, and
  reconstructing a decoded service data unit from the obtained data packets.

According to some embodiments, a set of coefficients for Network Decoding may comprise coefficients retrieved from each header of the received protocol data units. According to some embodiments, the step of de-encapsulating may further comprise:
  retrieving a sequence number comprised in the header of each received protocol data unit;
  stemming an indication about the service data unit from which the received protocol data unit is issued.

According to some embodiments, the step of de-encapsulating may further comprise:
  retrieving a sequence number comprised in the header of each protocol data unit deriving from the same service data unit;
  stemming an indication on a set of coefficients for Network Decoding for each combined data packet.

The present document also provides a method of wireless reception of protocol data units, the method comprises:
  receiving protocol data units from one or more radio link modules, wherein each protocol data unit comprises a header comprising a sequence number associated with the protocol data unit;
  de-encapsulating, from the received protocol data units, combined data packets obtained by applying a Network Coding at an encoder, wherein each combined data packet is associated with an identifier linked to the applied Network Coding, and wherein the sequence number and the identifier are linked by a function shared with the encoder;
  obtaining identifiers of the combined data packets based on the shared function and the sequence numbers associated with the protocol data units;
  obtaining data packets by applying Network Decoding on the combined data packets identified by the obtained associated identifiers, and
  reconstructing a decoded service data unit from the obtained data packets.

According to some embodiments, a set of coefficients for Network Decoding is retrieved from a lookup table using the identifiers of the combined data packets.

The present document also relates to a user equipment configured to transmit protocol data units over one or more radio link modules, the user equipment comprising a processor configured to perform:
- splitting a service data unit, received from an upper layer, into a plurality of data packets;
- obtaining combined data packets, by applying Network Coding to the data packets, wherein padding is added, if necessary, to the service data unit or to data packets to have data packets of equal length to which is applied the Network Coding;
- encapsulating the combined data packets into at least one protocol data unit, wherein each protocol data unit comprises a header and wherein the header contains a padding indication for indicating whether padding has been added or not; and
- transmitting the at least one protocol data unit over the one or more radio link modules.

The present document also provides a user equipment configured to transmit protocol data units over one or more radio link modules, the user equipment comprising a processor configured to perform:
- splitting a service data unit, received from an upper layer, into a plurality of data packets;
- encoding the data packets by applying Network Coding in order to obtain combined data packets, each combined data packet being associated with an identifier linked to the applied Network Coding;
- encapsulating the combined data packets into protocol data units, wherein each protocol data unit comprises a header comprising a sequence number associated with the protocol data unit;
- transmitting the protocol data units over the one or more radio link modules, and wherein the sequence number and the identifier are linked by a predetermined function.

The present document also relates to a user equipment configured to receive protocol data units, the user equipment comprising a processor configured to perform:
- receiving protocol data units from one or more radio link modules, wherein each protocol data unit comprises a header comprising a padding indication associated with the protocol data unit;
- de-encapsulating, from the received protocol data units, combined data packets obtained by applying a Network Coding at an encoder, wherein each combined data packet is associated with a padding indicator;
- obtaining padding indicator of the combined data packets based on the padding indication;
- obtaining data packets by applying Network Decoding on the combined data packets;
- removing padding from the obtained data packets, and reconstructing a decoded service data unit from the obtained data packets.

The present document also provides a user equipment configured to receive protocol data units, the user equipment comprising a processor configured to perform:
- receiving protocol data units from one or more radio link modules, wherein each protocol data unit comprises a header comprising a sequence number associated with the protocol data unit;
- de-encapsulating, from the received protocol data units, combined data packets obtained by applying a Network Coding at an encoder, wherein each combined data packet is associated with an identifier linked to the applied Network Coding, and wherein the sequence number and the identifier are linked by a function shared with the encoder;
- obtaining identifiers of the combined data packets based on the sequence numbers associated with the protocol data units and the shared function;
- obtaining data packets by applying Network Decoding on the combined data packets identified by the obtained associated identifiers, and
- reconstructing a decoded service data unit from the obtained data packets.

The present document also relates to a base station configured to transmit protocol data units over one or more radio link modules, the base station comprising a processor configured to perform:
- splitting a service data unit, received from an upper layer, into a plurality of data packets;
- obtaining combined data packets, by applying Network Coding to the data packets, wherein padding is added, if necessary, to the service data unit or to data packets to have data packets of equal length to which is applied the Network Coding;
- encapsulating the combined data packets into at least one protocol data unit, wherein each protocol data unit comprises a header and wherein the header contains a padding indication for indicating whether padding has been added or not; and
- transmitting the at least one protocol data unit over the one or more radio link modules.

The present document also provides a base station configured to transmit protocol data units over one or more radio link modules, the base station comprising a processor configured to perform:
- splitting a service data unit, received from an upper layer, into a plurality of data packets;
- encoding the data packets by applying Network Coding in order to obtain combined data packets, each combined data packet being associated with an identifier linked to the applied Network Coding;
- encapsulating the combined data packets into protocol data units, wherein each protocol data unit comprises a header comprising a sequence number associated with the protocol data unit;
- transmitting the protocol data units over the one or more radio link modules, and wherein the sequence number and the identifier are linked by a predetermined function.

The present document also relates to a base station configured to receive protocol data units, the base station comprising a processor configured to perform:
- receiving protocol data units from one or more radio link modules, wherein each protocol data unit comprises a header comprising a padding indication associated with the protocol data unit;
- de-encapsulating, from the received protocol data units, combined data packets obtained by applying a Network Coding at an encoder, wherein each combined data packet is associated with a padding indicator;
- obtaining padding indicator of the combined data packets based on the padding indication;
- obtaining data packets by applying Network Decoding on the combined data packets;
- removing padding from the obtained data packets, and reconstructing a decoded service data unit from the obtained data packets.

The present document also provides a base station configured to receive protocol data units, the base station comprising a processor configured to perform:
  receiving protocol data units from one or more radio link modules, wherein each protocol data unit comprises a header comprising a sequence number associated with the protocol data unit;
  de-encapsulating, from the received protocol data units, combined data packets obtained by applying a Network Coding at an encoder, wherein each combined data packet is associated with an identifier linked to the applied Network Coding, and wherein the sequence number and the identifier are linked by a function shared with the encoder;
  obtaining identifiers of the combined data packets based on the sequence numbers associated with the protocol data units and the shared function;
  obtaining data packets by applying Network Decoding on the combined data packets identified by the obtained associated identifiers, and
  reconstructing a decoded service data unit from the obtained data packets.

The present document further relates to a computer program product for a programmable apparatus, the computer program product comprising instructions for carrying out one of the methods as described hereinbefore, when the program is loaded and executed by a programmable apparatus.

The present document further provides a non-transitory computer-readable medium storing a program which, when executed by a microprocessor or computer system in a device of a communication network, causes the device to perform one of the methods as described hereinbefore.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings:

FIG. 10 illustrates the control fields that may be added to the PDCP-Config field within the RRC connection configuration message;

DETAILED DESCRIPTION

Figure 1B:
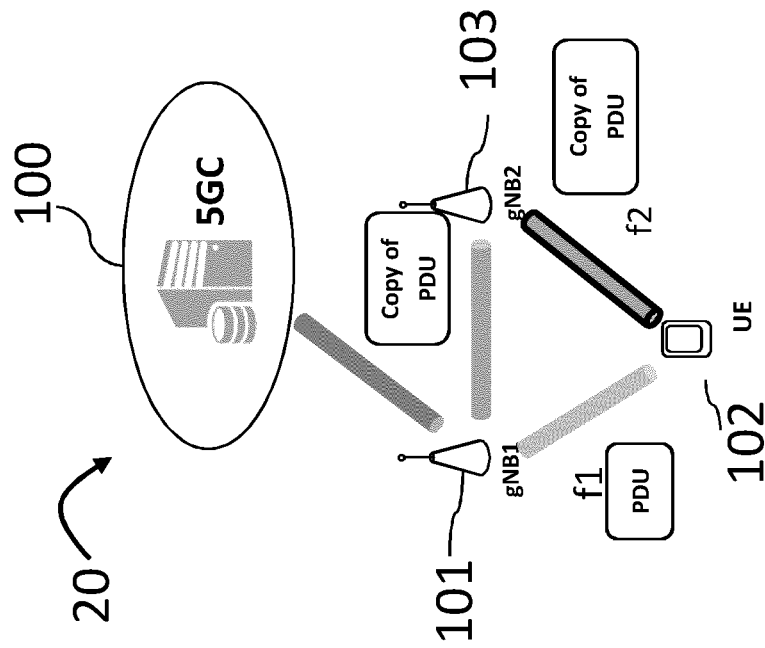
FIGS. 1a and 1b illustrate the network topologies in which the Network Coding scheme may be implemented.

A cellular communication network allows data to be exchanged between communicating devices such as user equipment (UE), e.g. a Mobile Terminal (MT), and the core of the network. For this, the cellular communication network comprises a Radio Access Network (RAN) that acts as an intermediate between the (UE) and the core network of the cellular communication network. UEs exchange data with other UEs of the network or with the core network using radio links, also called Radio Bearers.

The RAN thus comprises portion of the network and some equipment connecting the UE to the core network. In particular, the RAN comprises base stations (e.g. NodeB, eNodeB, gNodeB), governing the components of the RAN, and the connecting links between these equipments.

A Radio Bearer may relate to one or several cells, each defining a transmission path. The cell is defined by the coverage of the frequency used to transmit data over the Radio Bearer.

In 3GPP specifications (e.g. TS 23.501), typical functions performed by the components of the cellular communication network are detailed.

In order to ensure that these functions are correctly performed, a multi-layer protocol stack, as defined in 3GPP specification TS38.300, is implemented. Such a multi-layer protocol stack thus allows the mapping of incoming packets to the wireless transport channels at the transmit side, and the mapping of wireless transport channels to the outgoing packets at the receive side.

The protocol stack structure comprises several protocol layers distributed and implemented at different locations in the RAN.

A first protocol layer, called physical layer (PHY layer), is the lowest layer. The PHY layer provides means enabling the conversion of logical user data packets into a transmission formats, such as raw bits. The PHY layer further provides means for transmitting converted data over a physical link, such as a modulated carrier signal. Functions of this layer are generally implemented by the UE and by the base stations of the RAN. The protocol layers are thus implemented as modules at different locations within the RAN.

A second protocol layer, called Media Access Channel (MAC) protocol, provides means for selecting the transmission format that is available for the user data packet. Further, the MAC layer provides means for mapping the logical channels to the transport channels. The MAC layer also handles a part of the Hybrid Automated Repetition request scheme. Functions of this layer are implemented by the base stations and the UE of the network.

A third protocol layer, called Radio Link Control (RLC) layer provides the segmentation of user data packets in order to make them suitable for the transport format selected by the MAC layer. The RLC layer is also responsible for requesting retransmissions of missing packets, based on an acknowledge signalling scheme ACK/NACK. ACK/NACK indicates which packets were received or not received. The RLC layer passes or receives its egress/ingress packet to/at only one MAC module. Functions of this layer are implemented by the UE and base stations of the cellular network.

A fourth protocol layer, Packet Data Convergence Protocol (PDCP) layer handles IP header compression/decompression, ciphering/deciphering and integrity of the user data packet in the transmitting and receiving modules of either UEs or base stations of the RAN. Further, the PDCP layer also handles the numbering of the packets on the emitter side, and reordering the received packets on the receiver side.

For example, the PDCP layer encapsulates (when placed on the transmitting path) or de-encapsulates (when placed on the receiving path) the user data packet issued from or sent to the above Service Data Adaptation Protocol (SDAP) layer, or the control packet issued from the Radio Resource Control (RRC). Particularly, the encapsulation involves adding a header carrying information necessary for the PDCP functions. This information may comprise a sequence number (to order the incoming packets at their receiving), a control/data identification bit (to distinguish control packets from user data packets), and a Protocol Data Unit (PDU) type information when the control bit is set. The PDCP may pass or receive its egress/ingress packets to plurality of RLC modules in carrier aggregation and multi-connectivity modes (described hereinafter in reference to FIGS. 1a and 1b).

These protocol layers are mostly common to the Control Plane and the User Plane (except the SDAP layer and the RRC layer). Consequently, these layers are configured to handle both of control packets and data user packets.

In the Control plane, the Radio Resource Control (RRC) layer, handles:
broadcasting of information necessary to a UE to communicate within a cell,
connection management, including setting up Radio Bearers, including the configuration of the protocol stack,
devices capabilities, as not all the devices can support all the functionalities described in the specifications.

In other words, RRC modules of the base stations and the UEs handle the configuration of the protocol modules (SDAP, PDCP, RLC, MAC and PHY layers) of the User Plane protocol stack.

In the $5^{th}$ generation of 3GPP standardized network, 5G New Radio (NR), Control and Data packets are strictly separated. The separation is handled by the protocol stack layers so that control data packets and user data packets do not share Radio Bearers. Radio Bearer that handles control data packets are called Signalling Radio Bearers, while Radio Bearers that handle user data packets are called Data Radio Bearers.

Further, 5G networks differ from the networks of the preceding generations as they now handle Quality of Service (QoS).

For this, in the User Data plane, the Service Data Adaptation Protocol (SDAP) layer handles the QoS. The QoS is flow based, i.e. it may dependent on the nature of the flow (such as audio flow, video flow, http flow depending on the running applications). For example, audio and video flows may have a better QoS than http flows.

Indeed, each user data packet is marked with a QoS Flow Identifier (QFI). User data packets having the same QFI constitute a QoS flow. All the 5G QoS flows are then mapped in the network of (Data or Signalling) Radio Bearers.

Consequently, a given Radio Bearer may transport several data packets only if the data packets belong to the same class of QoS, i.e. have the same QFI. The role of the SDAP layer is to attribute a Radio Bearer to each QoS flow.

Finally, 5G RAN provides a flexible use of the radio bandwidth, by introducing a scalable subcarrier spacing within the OFDM symbol, from 15 kHz to 240 kHz. Thus, a transport channel results from the combination of selected parameters, such as the flexible use of radio bandwidth number of transmission time intervals, modulation or power.

Figure 1A:
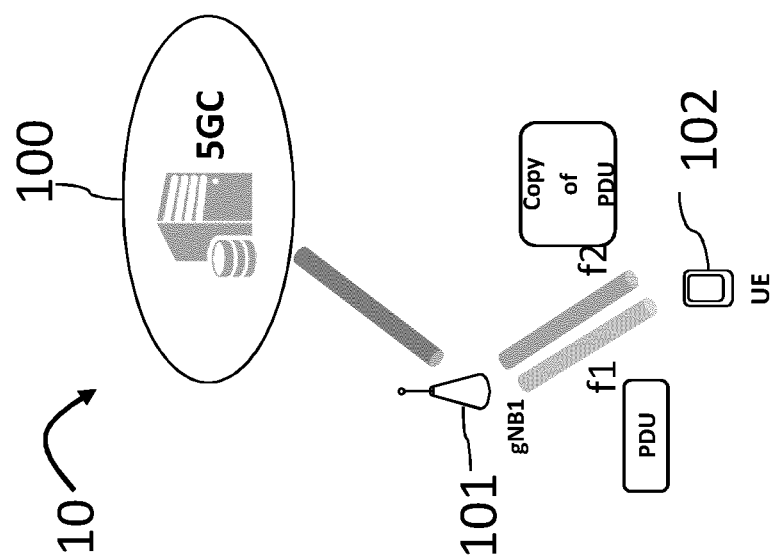

When communicating devices of the RAN exchange data, they may operate according to two specific network topologies. FIGS. 1a and 1b illustrate these network topologies of a 5G network that may benefit from the invention.

The first network topology, called carrier aggregation is shown at FIG. 1a. In this illustrated example, a Protocol Data Unit (PDU) is transmitted from the core 100 of the network 10 to a UE 102. In this topology, the UE 102 is in communication with a single base station 101, gNB1.

In order to avoid high loss ratio, a duplication mechanism may be implemented within this topology. A Radio Bearer, allowing data transmission between the core of the network and the UE, comprises two cells. The UE initiates a connection with a first cell, called Primary cell, associated with a first carrier frequency f1, and a second cell, called Secondary cell, associated with a second carrier frequency f2. For downlink transmissions (from core network to UE), the data received by the base station 101 from the core network 102 are transmitted in the form of Protocol Data Units (PDUs) sent by the base station 101 to the UE 102 on the first carrier frequency f1, while a copy of the PDUs are sent to the UE on the second different carrier frequency f2. The transmission of a PDU and its copy may be simultaneous or not. Duplication in uplink transmissions (from UE to core network) is also feasible in the reverse way.

In order to use these two frequency carriers f1 and f2, the Radio Bearer comprises two RLC modules at the base station 101 which passes data to a MAC module in a primary or secondary logical channel. It may be possible that the Radio Bearer comprises a single MAC module or two distinct modules, each being associated with different RLC layers. When using a single MAC module, the MAC module is then responsible for the logical channel mapping restrictions to ensure that data of the primary and second logical channel are not sent over the same frequency carrier. One benefit of using a single MAC module is that it improves the synchronization of the emission of the duplicated packets. However, this does not preclude that the reception of the duplicate packets will be within the same period of time.

The second topology, called dual connectivity, is shown at FIG. 1b in which a duplication mechanism may also be implemented. In this network topology, the UE 102 is in communication with two base stations of the network 20, gNB1 101 and gNB2 103. The Radio Bearer, allowing data transmission between the core 100 of the network 20 and the UE 102, comprises a primary cell and a secondary cell. For downlink transmissions, data coming from the core 100 of the network 20 to be transmitted to the UE 102, are formatted in PDUs which are first duplicated in the first base station gNB1 101. A PDU is then transmitted on one leg of the primary cell of the Radio Bearer, between the first base station gNB1 101 and the UE 102, over a first carrier frequency f1. A copy of the PDU is then sent to the second base station gNB2 103. The second base station gNB2 103 then forwards the copy of the PDU on the other leg of the Radio Bearer, between the second base station gNB2 103 and the UE 102, over a second carrier frequency f2. Duplication in uplink transmissions is also feasible in the reverse way.

When the network 20 is operating as a dual connectivity network topology as shown at FIG. 1b, the Radio Bearer comprises two distinct RLC layers, each being implemented by RLC modules of the two different base stations of the network 20, gNB1 101 and gNB2 103.

Such a Radio Bearer is also called split Radio Bearer as PDU and the copy of the PDU are transmitted using the primary and secondary cells respectively associated with a first and second base station, gNB1 101 and gNB2 103.

Both of these network topologies require a specific implementation of the interactions between the layers of the protocol stack presented above. This implementation is carried out by the constituent components of the radio structures of the base station and of the UE of the communication network.

Figure 2:
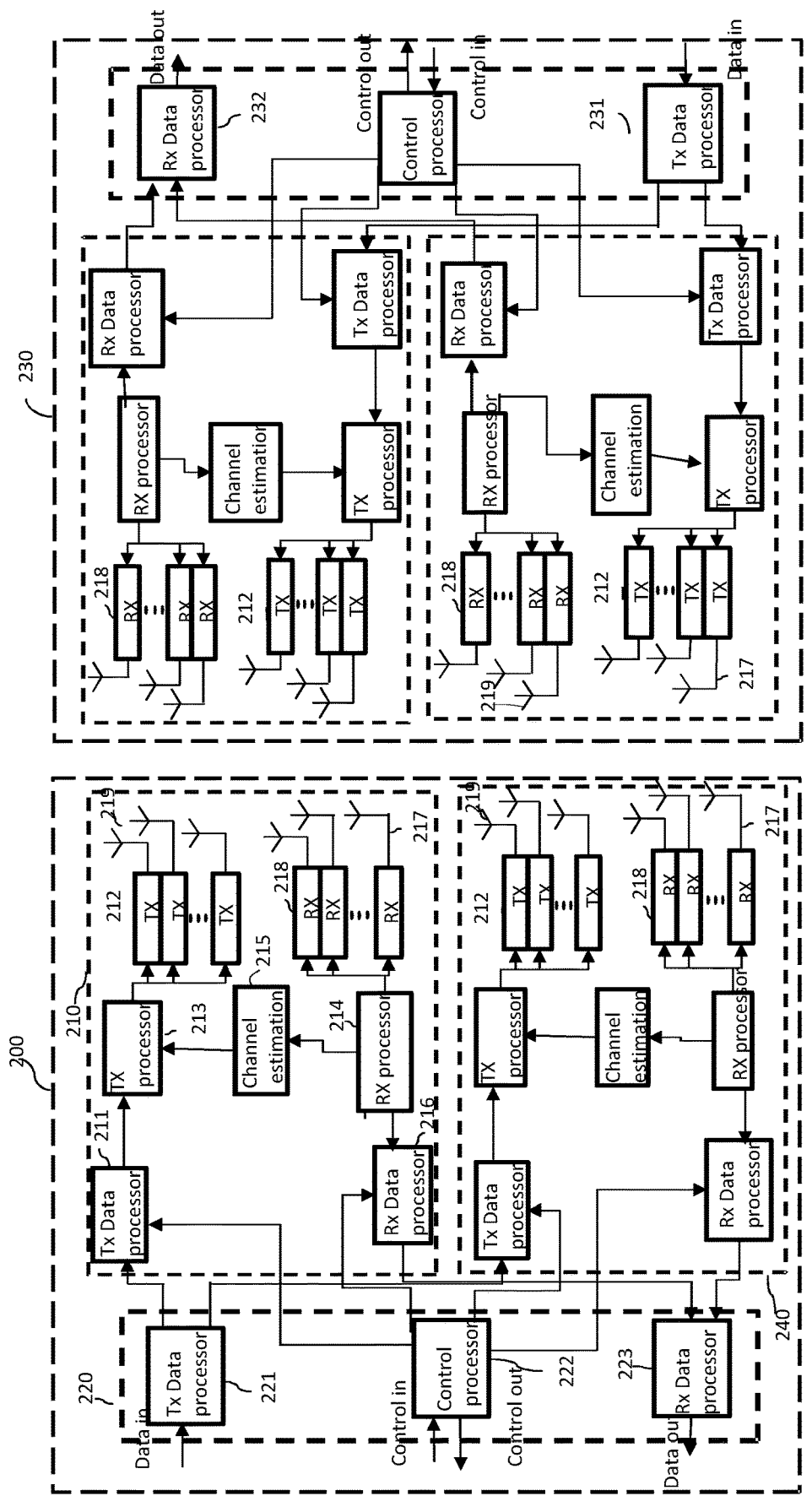
FIG. 2 illustrates a bloc diagram of radio structures, of the user equipment and the base station, in the 5G NR networks.

FIG. 2 illustrates a block diagrams of the radio structures of the base station 200 and of the UE 230, as known in the prior art. Both radio structures are functionally equivalent and both comprise one or several radio modules. The main difference between the radio structure of the base station and that of the UE is the number of radio modules: thus, while a UE may contain only one, 2 or 4 radio modules, a base station may contain a flock of radio modules to be capable of handling a minimum of 16 simultaneous communications.

In the illustrated examples of FIG. 2, the radio structures 200, 230 comprise only two radio modules 210, 240.

In the context of 5G, a new radio access technology (5G NR) has been developed to be the global standard for the air interface. As 5G NR is a MIMO system, the radio modules 200, 230 have several antennas 219 and 217 and several analogue radio modules 212 and 218.

Data may flow in two directions. The downlink (DL) is defined by data entering into the TX data processor 221 of radio structure 200 of the base station, and going out at RX data processor 233 of the radio structure 230 of the user equipment. The uplink (UL) is defined by data entering into the TX data processor 231 of the radio structure 230 of the user equipment and going out at the RX data processor 223 of the radio structure 230 of the base station.

The control of the radio modules 210, 240 is made by the Control Processor 222. The Control processor 222 hosts the Radio Resource Control (RRC) module configured to implements the functions of the RRC layer.

This architecture allows the data to be transmitted coming into the transmission data processor (Tx Data processor) 231, 221 of either the base station or the user equipment to be handled by two different radio modules 210, 240. The Tx Data processor 221, 231 and the reception data processor (Rx Data processor) 223, 233 are configured to implement the functions of the PDCP and SDAP layers.

Each radio module 210, 240 comprises a transmission data processor (Tx Data processor) 211, a transmission processor (Tx processor) 213, a reception data transmission processor (Rx Data processor) 216, and a reception processor (Rx processor) 214.

Tx processor 213 and RX processor 214 are configured to execute the function of the PHY layer of the protocol stack, as detailed hereinbefore. These Tx and Rx processors 213, 214 are also configured to implement the coding/decoding functions of the 5G NR MIMO system.

Tx Data processor 211 and Rx Data processor 216 are configured to implement the functions of the PDCP, RLC and MAC layers of the protocol stack.

According to some embodiments, the block 220 comprising the Control processor 222, the Tx Data processor 221 and Rx Data processor 223, may be physically separated from the radio modules 210 and 240.

The block 215, called channel estimation, enables the configuration of the transport channel (the frequency carrier) by selecting a combination of parameters.

When operating as a dual connectivity configuration, a radio structure 230 of a user equipment is able to communicate with two base stations 200 as illustrated in FIG. 2.

Figure 3:
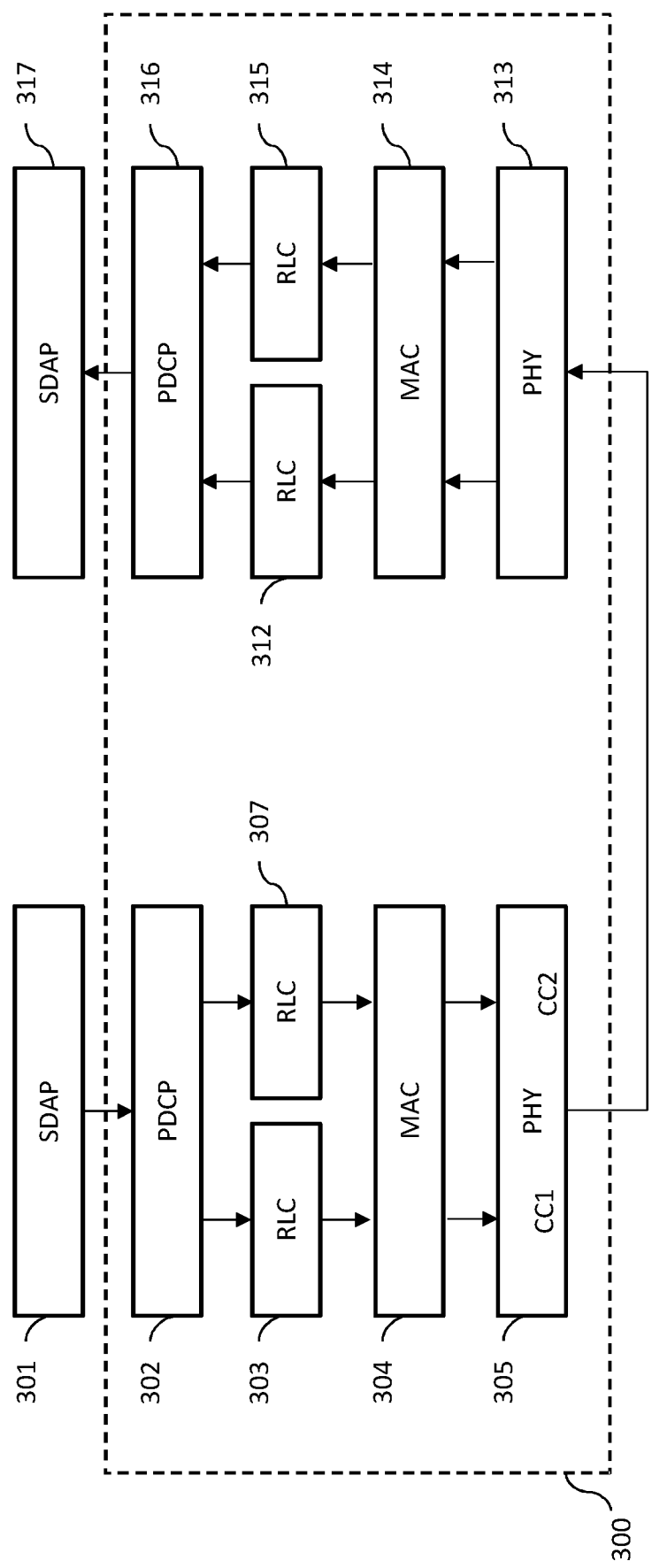
FIG. 3 illustrates an example of the protocol stack for a network having a topology using dual connectivity and where the Network Coding scheme may be implemented.
Figure 4:
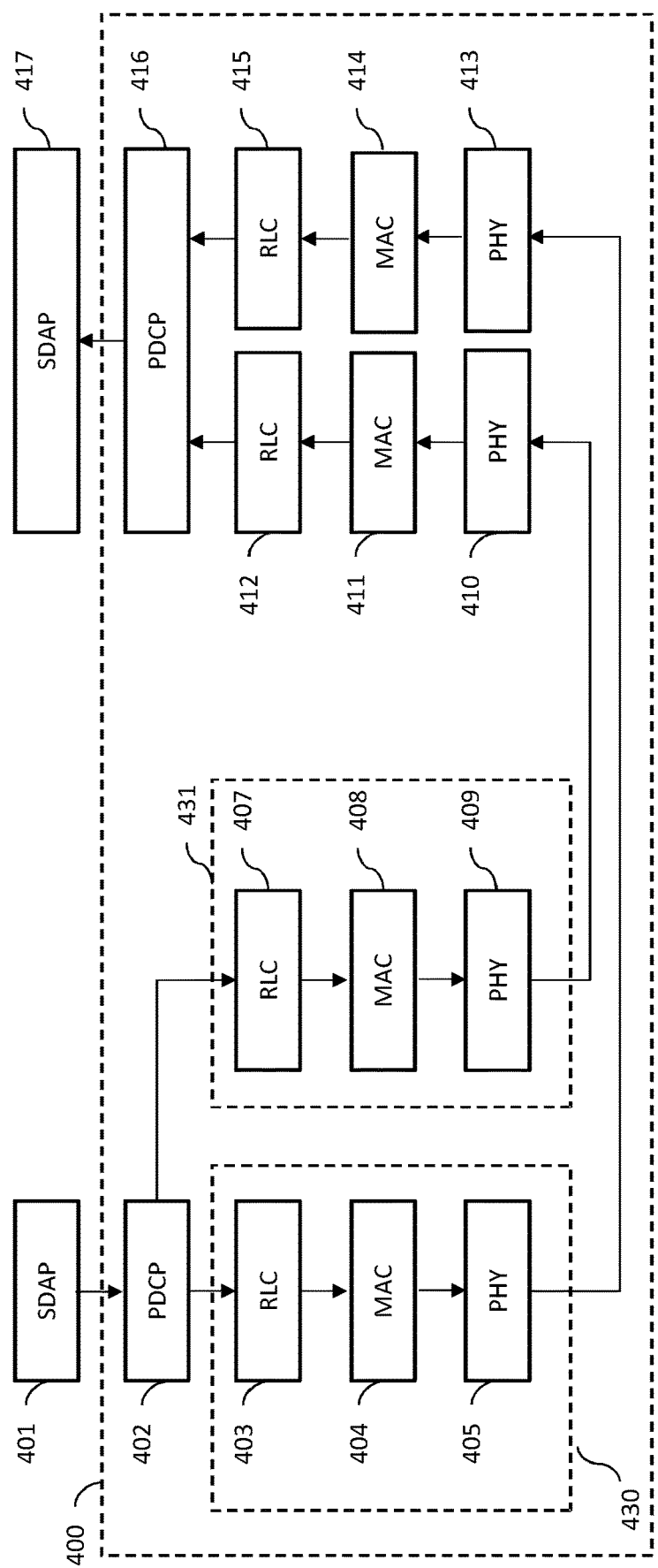
FIG. 4 illustrates an example of the protocol stack for a network operating according to the carrier aggregation network topology and where the Network Coding scheme may be implemented.

In order to better understand the interactions between the layers of the protocol stack, and between the components of the radio structure implementing the functions of the layers of the protocol stack, FIGS. 3 and 4 respectively illustrate the interactions of the protocol layers of the user plane in a carrier aggregation network topology and a dual connectivity network topology.

The user data packet coming from the core network (for downlink transmission to the UE) or from applications running on the UE (for uplink transmission to the core network), first enters the SDAP protocol layer 301. The role of the SDAP layer 301 is to associate the data packet to a Data Radio Bearer based on the QFI of the data packet. If a Radio Bearer already exists for the given QFI for a former data packet, the Radio Bearer is associated with the data packet, otherwise a new Radio Bearer is created.

The output of the SDAP layer 301 enters the data Radio Bearer 300. As explained in reference to FIG. 1a, in order to have two frequency carriers from the same base station, the Radio Bearer is composed of a PDCP layer 302, a first and a second RLC layers 303,307, a unique MAC layer 304 and a PHY 305. As explained hereinbefore, it may be possible to have two distinct MAC layers. The first and second RLC layers forms two logical channels that are associated with two different transport blocks. The two transport blocks are then associated with two different carrier components of the physical channel. The carrier components provide the distinct frequency carriers transporting the data to the PHY layer of a base station or a UE. This provides a frequency diversity.

The physical channel is then captured by the PHY layer 313 of the receiving base station or the user equipment. The output of the PHY layer 313 is then sent to the MAC layer 314. The MAC layer 314 provides a first and a second transport blocks respectively which outputs packets to the first RLC layer 312 and the second RLC layer 315. The PDCP layer 16 has the task of transmitting to the SDAP layer the first received output coming of one of the two RLC layers, and of discarding the secondly received packet. The SDAP layer then outputs data towards the upper layers of the receiving base station or the user equipment.

The layers interact slightly differently in the context of dual connectivity network topology as illustrated in FIG. 4 (case of downlink transmission from the core network to the UE).

The user data packet coming from the core network first enters the SDAP protocol layer 401. Similarly, to the SDAP layer in the carrier aggregation network topology, the role of the SDAP layer 401 is to associate the data packet with a Data Radio Bearer based on the QFI of the data packet. If a Radio Bearer already exists for the given QFI for a former data packet, the Radio Bearer is associated with the data packet, otherwise a new Radio Bearer is created.

The output of the SDAP layer 401 enters the data Radio Bearer 400. As explained in reference to FIG. 1b, in order to enable the communication with two base stations, the layers are implemented in two different base stations.

Thus, the Radio Bearer 400 comprises a first PDCP layer 402 which outputs towards a first logical channel 430 and a second logical channel 431 respectively implemented by a first and by a second base stations. The first logical channel 431 is composed of a first RLC layer 403, a first MAC layer 404 and a first PHY 405. The second logical channel a second RLC layer 403, a second MAC layer 404 and a second PHY layer 405. The first and second logical channels are respectively associated with different physical channels.

The first physical channel is captured by the PHY layer 413 of the user equipment. Data packets then enter the MAC layer 414, then the RLC layer 414 and go to the PDCP layer 416.

On the other side, the first physical channel is captured by the PHY layer 410 of the user equipment. Data packets then enter the MAC layer 411, then the RLC layer 412 and go to the PDCP layer 416.

If both of the packets are received by the PDCP layer 416, the PDCP layer transmit to the upper layer of the receiving base station just one of the received packets.

As functions of the layers 403, 404 and 405 are implemented on a first base station, and functions of the layers 407, 408 and 409 are implemented on a second base station (see FIG. 1b), the Radio Bearer 400 is referred to as a split bearer. The functions 403, 404, 405, 413, 414, 415 form a first "leg". The functions 407, 408, 409, 410, 411, 412 form a second "leg".

Uplink transmissions (from the UE to the core network) can be handled conversely.

The present method aims at providing a method of wireless transmission of data, coming from the core of the network or an application running on a UE, implemented at the PDCP, according to the carrier aggregation or the dual connectivity mode, or even without these modes (but without spatial and frequency diversities in this case).

FIGS. 5a and 5b illustrate examples of the transmitting method implemented at the PDCP layer, in the transmission side, without or with the method according to the present document.

As illustrated in FIG. 5a, it is known that the PDCP layer receives a Service Data Unit (SDU) which is either a user data packet from the SDAP layer or a control data packet from the RRC layer. Data from the SDAP layer or the RRC layer are thus first stored in a buffer 501, until all data of a user/control data packet are received. When all data of a data packet have been received, the IP header of the received data/control data packets is compressed. Then, in the user plane, an integrity function 504 calculates a hash sequence of the user data and appends it to the packet. Next, the user data packets, obtained after the integrity function, are encrypted using a ciphering function 505. Functions 504 and 505 are bypassed in the control plane, i.e. these functions are not applied to the control data packets (indicated by the arrow 508). Before routing the data packets, data packets are encapsulated by adding a PDCP header 506 to form a PDCP Protocol Data Unit (PDU). The header comprises information necessary to subsequent PDCP functions on the receiving side. The information may thus comprise a sequence number, a control/data identification bit, and a PDU type information when the control bit is set. In particular, the sequence number may be used to reorder the data packets on the receiving side.

Then, depending on whether the network is operating according to a single connectivity network topology, or in carrier aggregation (as in FIG. 1a), or in multi connectivity (as in FIG. 1b, involving a plurality of base stations), the PDU is routed 507, and optionally its copy in case of duplication is also routed.

The PDCP layer may pass its egress data packets to a multiplicity of RLC modules (up to 4) in multi-connectivity modes.

As illustrated in FIG. 5b, in the invention, an additional function 503 is used in the user plane, Network Coding that is applied right after the header compression function 502. The function of Network Coding aims at:

encoding data packets to be transmitted into several encoded data packets using linear combinations;

transmitting these encoded data packets instead of the original data packets, then using the coefficients of the linear combinations to retrieve the original data packets.

The Network Coding encoding is the following operation:

$$P_{nc,m} = \sum_{\forall m} C_{nc,m} S_{nc,m}$$

where P is the encoded data packet, S is the data packet to be encoded, m is above or equal to N and $C_{nc,m}$ and is a selected coefficient of a Galois field, either randomly or not. If coefficients are chosen randomly, Network Coding is called Random Linear Network Coding (RLNC).

Network Coding of N packets is the following operation:

$$\begin{pmatrix} P_{nc,1} \\ \vdots \\ P_{nc,N} \end{pmatrix} = \begin{pmatrix} C_{1,1} & \cdots & C_{N,1} \\ \vdots & \ddots & \vdots \\ C_{N,1} & \cdots & C_{N,N} \end{pmatrix} \begin{pmatrix} S_{nc,1} \\ \vdots \\ S_{nc,N} \end{pmatrix}$$

where N encoded data packets are obtained and the matrix C, also called the coding matrix, is invertible.

According to some embodiments, if the data packets S to be encoded are bytes, then the elements of the coding matrix C may be chosen in the Galois Field $GF2^8$.

Network Coding is known to be an efficient means to achieve a low packet error ratio with the minimum of redundancy, since it is possible to recover all packets as soon as N encoded packets are correctly received, N being the number of original packets being encoded.

Such a Network Coding function 503 may impact the header function 506 as a different header is used.

The Network Coding scheme allows the spectral efficiency to be improved, as only N packets (encoded or not encoded) are enough to obtain all the data originally contained in the data packet to be encoded.

Further, by implementing the Network Coding scheme at the PDCP sublayer, the encoded packets may thus be distributed over several transmission paths associated with several RLC layers/modules in order to increase the spatial and frequency diversity.

Figure 6:
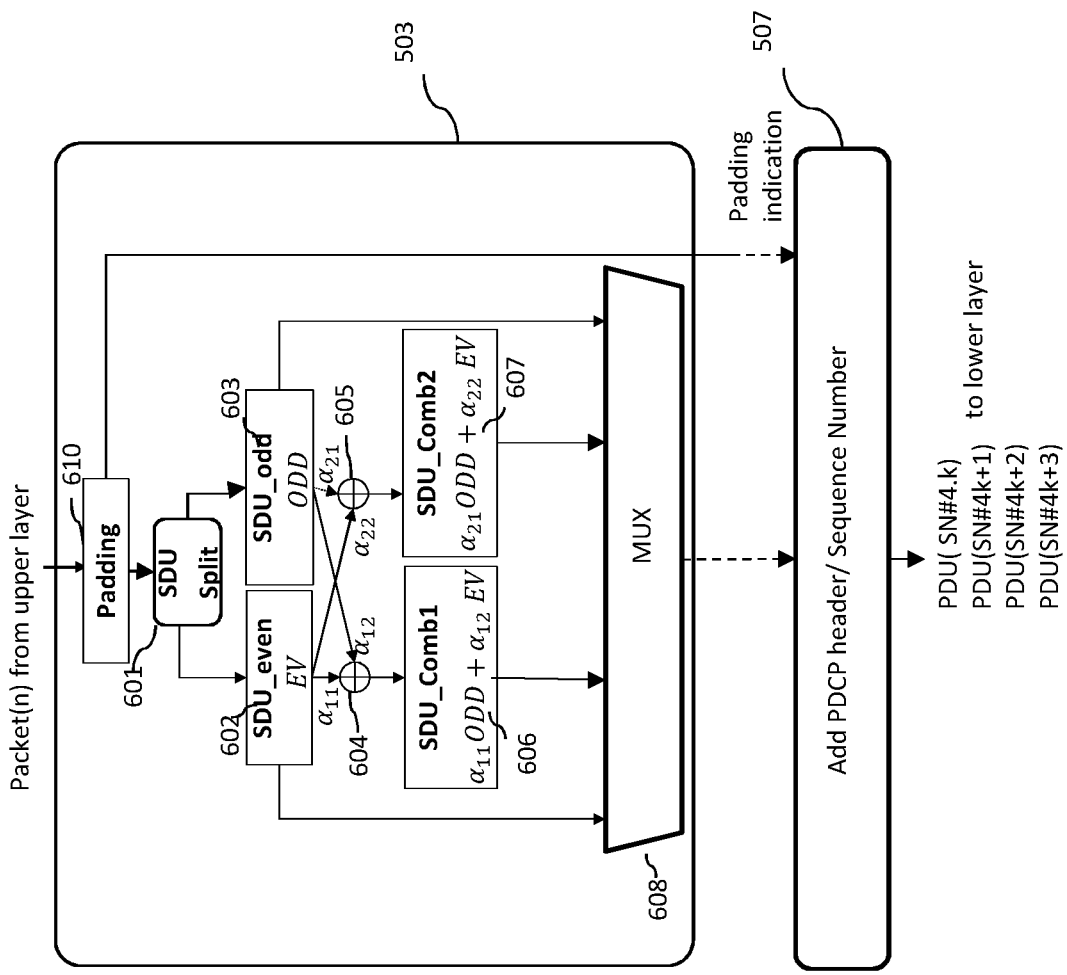
FIG. 6 illustrates the proposed Network Coding function (on the transmitting side) of the method according to the present document.

An example of implementation of Network Coding on the transmission path is illustrated in FIG. 6. Of course, this the present method is not limited to this proposed Network Coding function that may be adapted according to the practices known in the state of art.

Figure 5:
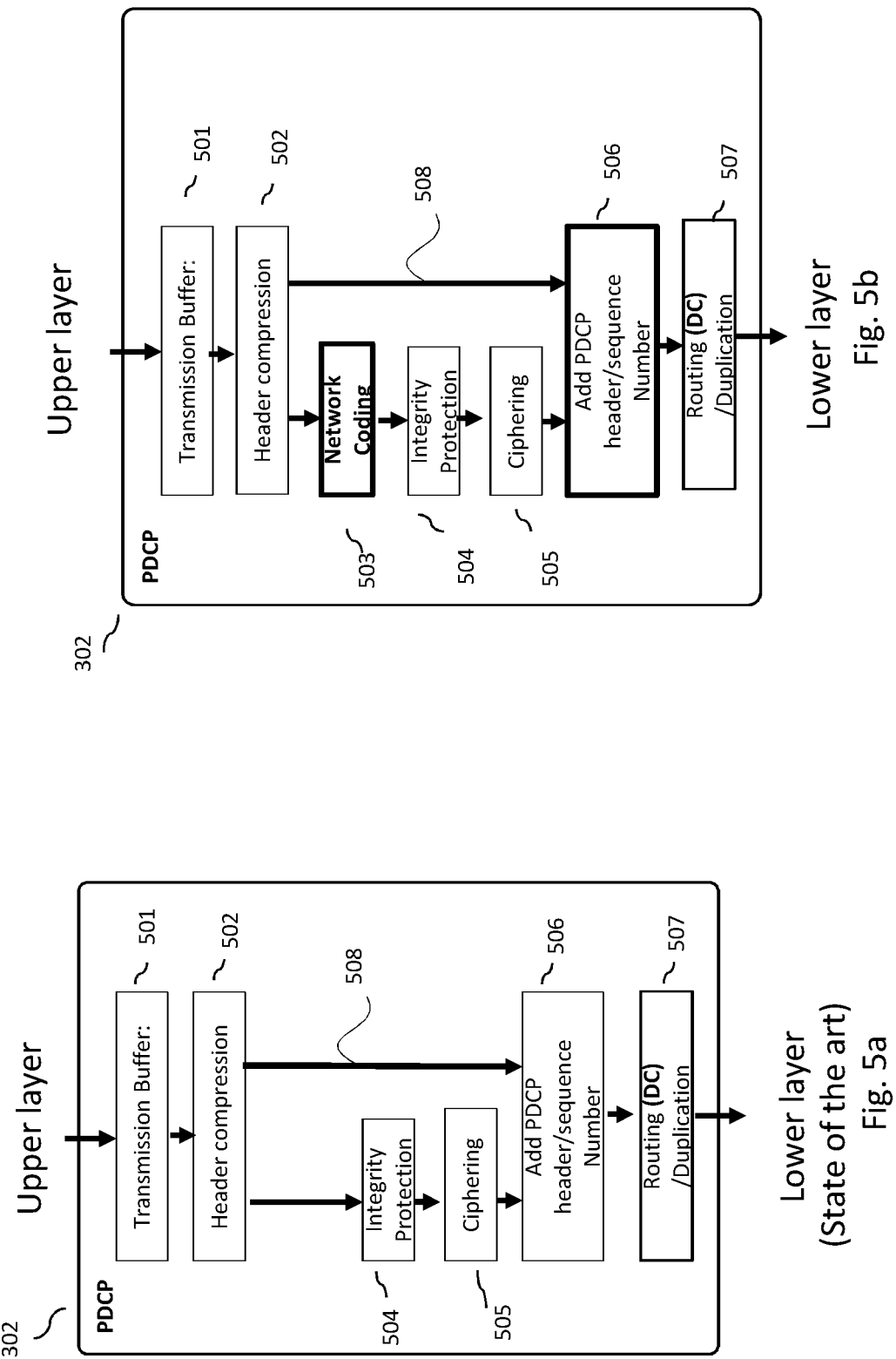
FIGS. 5a and 5b illustrate PDCP layer functions (on the transmitting side) with and without the method according to the present document being implemented.

A Network Coding function 503 of FIG. 5 is detailed in FIG. 6.

First, the function 503 receives service data units (SDUs) from the upper layer to be transmitted over one or several radio link control modules. The received SDUs are processed one after the other. Hereinafter, the example is described for the $k^{th}$ incoming SDU that may be referred to as the original SDU.

Next, the $k^{th}$ received service data unit is transmitted to a padding function 610 that may comprise the following:
  determining a length of the received service data unit;
  if the length of the received service data unit is not a multiple of a predefined number n, padding the received service data unit in order to obtain a new length of the padded received at least one service data unit, the new length being a multiple of the predefined number n.

The padding function aims at appending dummy data to the received/incoming service data units, in order to change their length so that it can be divided by the predefined number n of packets of equal length. For instance, for a split into two packets, if the length of the received service data unit is odd, one byte of dummy data (all zeroes) is appended to the received service data unit. If the length of the received service data unit is even, the received service data unit is not padded.

When a service data unit is padded, a padding indicator is set as an input of the encapsulation function 506, so that a padding indication in the PDCP header appended to each PDU output by the PDCP layer. The padding indicator shall be the same in each PDU.

After, the $k^{th}$ service data unit is then processed by the SDU splitter function 601, which splits the $k^{th}$ received padded service data unit into n data packets. In the present example, the service data unit is split into two data packets, as illustrated by the two arrows starting from the SDU split 601.

The splitting may be done in several different ways.

In the present example, the (SDU_length/2) first bytes are placed in a first packet, referred as EVEN SDU 602, while the following bytes are gathered in a second packet, referred to as ODD SDU 603.

According to some embodiments, splitting may involve sorting 1 byte every 2 bytes and placing the sorted byte either n the EVEN SDU or the ODD SDU.

The obtained two data packets are then stored in 602 for the half PDU called EVEN SDU, in 603 for the half PDU called ODD SDU.

Next, combined data packets are obtained by applying Network Coding to the n data packets. To obtain the combined data packets, a set of coefficients is first obtained (they are predefined and stored in internal memory). Then, the combined data packets are calculated in a Galois Field (GF) as a combination of the data packets obtained from the splitting function and the obtained set of coefficients.

Using a multiplexer 608, four packets are output: EVEN SDU, ODD SDU and two packets resulting from a combination of EVEN and ODD SDU. The combination is a linear combination.

The first combined packet, referred to as COMB1 SDU, results from the addition byte to byte of the result of byte to byte multiplications by two different coefficients $\alpha_{11}$, $\alpha_{12}$ of the bytes within ODD SDU and EVEN SDU.

The multiplication by the different coefficients is indicated in the Figure by a coefficient indicated near the arrows and the addition is represented by the symbol 604. According to some embodiments, (but non-limitative), the operations are made in the Galois Field GF256.

The second combined packet, referred to as COMB2 SDU, results from the addition byte to byte of the result of byte to byte multiplications by two different coefficients $\alpha_{21}$, $\alpha_{22}$ of the bytes within ODD SDU and EVEN SDU.

Actually, the packets EVEN and ODD are also combined packets in the sense that EVEN is the result of the combination of EVEN and ODD with the coefficients (1, 0), and ODD is the result of the combination of EVEN and ODD with the coefficients (0, 1).

The multiplication by the different coefficients is indicated in the Figure by a coefficient indicated near the arrows and the addition is represented by the symbol 605. According to some embodiments, (but non-limitative), the operations are made in the Galois Field GF256.

Not all sets of 4 coefficients in GF 256 can be used. For example, using a plurality of ones and zeros must be excluded, as the original data would be unchanged. Further, and $\alpha_{11} \times \alpha_{22}$ shall not be equal to $\alpha_{21} \times \alpha_{12}$ otherwise the linear combinations would be identical (i.e. COMB1 would identical to COMB2).

At the output of the multiplexer, four packets are then available, which are four combined data packets. This number of 4 combined packets is given as example. Less or more combined packets can be generated and transmitted. As the objective is to improve the transmission reliability, more than 2 combined packets should be transmitted to overcome the possible packet loss.

Next, the combined data packets are encapsulated, i.e. PCDP headers are added to each of the combined data packets, so as to obtain four PDUs to be distributed over the RLC modules.

In another embodiment, several packets may be appended in a single PDU. In another embodiment, a packet may be split over several PDUs.

According to some embodiments, the used coefficients, for a given obtained PDU, may be set as an input of the encapsulation function 506, such that the coefficients may be directly retrieved from the header.

Before being transmitted, each of the PDUs is associated with a sequence number added in the header of the respective PDU.

According to some embodiments, the header may comprise some bits to identify the linear combination (i.e. the set of coefficients) used to generate the coded packet carried in the PDU. To avoid these specific bits, the sequence number may be used to identify the coded packet. With the example of FIG. 6 where each PDU carries a single packet, the sequence number may be of the form 4k+t, where t is the identifier of the combined data packet and belongs to the set {0, 1, 2, 3}, and k is because the original SDU (from which derived the PDUs) is the $k^t$h incoming SDU. Each value of t is associated with a linear combination that may be obtained after the Network Coding scheme, i.e. in the present example, EVEN PDU, ODD PDU, COMB1 PDU and COMB2 PDU. Thus, in the present example, the sequence numbers are the following:
 EVEN PDU_SN=4k+0
 COMB1 PDU_SN=4k+1
 COMB2 PDU_SN=4k+2
 ODD PDU_SN=4k+3

According to some embodiments, a number m of packets may be appended in a unique PDU. In this case, assuming z is the total number of combined packets at the output of the multiplexer (and issuing from the same $k^{th}$ SDU), then the sequence number k·z/m is associated with the PDU carrying the m first packets output by the multiplexer (and issued from the SDU k), the sequence number k·z/m+1 is associated with the PDU carrying the m next packets output by the multiplexer, etc. This assumes that the ordering of packets at the output of the multiplexer is fixed and known by the receiver. To reduce complexity of implementation, z shall be a multiple of m.

The mathematical relationship between the sequence number SN_unique_PDU and the identifier t of the first combined packet appended in the PDU is:

$$\text{SN\_unique\_PDU} = \frac{z \times k}{m} + PE\left(\frac{t}{m}\right),$$

where PE is the floor function.

According to other embodiments, a packet is split over a number R of PDUs. In this case, assuming z is the total number of packets at the output of the multiplexer, then the sequence number SN=k·z·R+1 is associated with the PDU carrying the first part of the first packet output by the multiplexer (and issued from the $k^{th}$ SDU), the sequence number SN=k·z·R+R is associated with the PDU carrying the last part of the first packet, the sequence number k·z·R+R+1 is associated with the PDU carrying the first part of the second packet (issued from the $k^{t}$h SDU) output by the multiplexer, etc.

The mathematical relationship between the sequence number $PDU_{SN}$ and p, where p is the number of the part of the combined data packet is:

$$PDU_{SN}=R(zk+t)+p$$

After the encapsulation, the PDUs are finally transmitted to the lower layer handling the transmission. When the Radio Bearer comprises several RLC modules, then the RLC modules take in charge a different set of PDUs each. With the example of FIG. 6 in relation with the FIG. 2 or 3, a first RLC module takes in charge the PDUs EVEN and COMB1, while the second RLC module takes in charge the PDUs ODD and COMB2, According to some embodiments, RLC modules are handled by one same base station.

According to some embodiments, RLC modules are handled by several base stations.

FIGS. 7*a* and 7*b* illustrate some examples of the receiving method implemented at the PDCP layer, at the receiving side, without or with the method according to the present document.

As illustrated in FIG. 7*a*, protocol data unit are received from several RLC modules (see FIGS. 3 and 4, 312, 315, 412 and 415). These protocol data unit are first stored into a reception buffer 701, where the PDCP header is removed. Therefore, combined data packets output from the reception buffer 701

If the packet is a control packet (the PDCP header indicates whether the packet is control or data), the packet is presented directly to the header decompression function 706. If the packet is a user data packet it is presented to the deciphering function 702. The output of the deciphering function enters the integrity verification function 703. The integrity verification function 703 involves calculating a hash and compares it to a received hash (appended to the transmitted data packet, as explained in reference to FIG. 5*a*). If the calculated hash is identical to the received hash, the data integrity is confirmed. The hash is then removed, and the packets are reordered in the buffer 704 and sent to the header decompression function 706. The output of the header decompression function 706 is then either directed to the SDAP the packets are user data packets, or directed to the RRC if the packets are control data packets.

With the invention, as can be seen in FIG. 7*b*, an additional function is implemented at the PDCP layer, the network decoding function 705. The output of the reordering function is presented to the network decoding function 705. The output of the reordering function may comprise the received packets reordered according to the sequence number of PDUs. The output of the network decoding is then directed to the decompression function 706.

Figure 8:
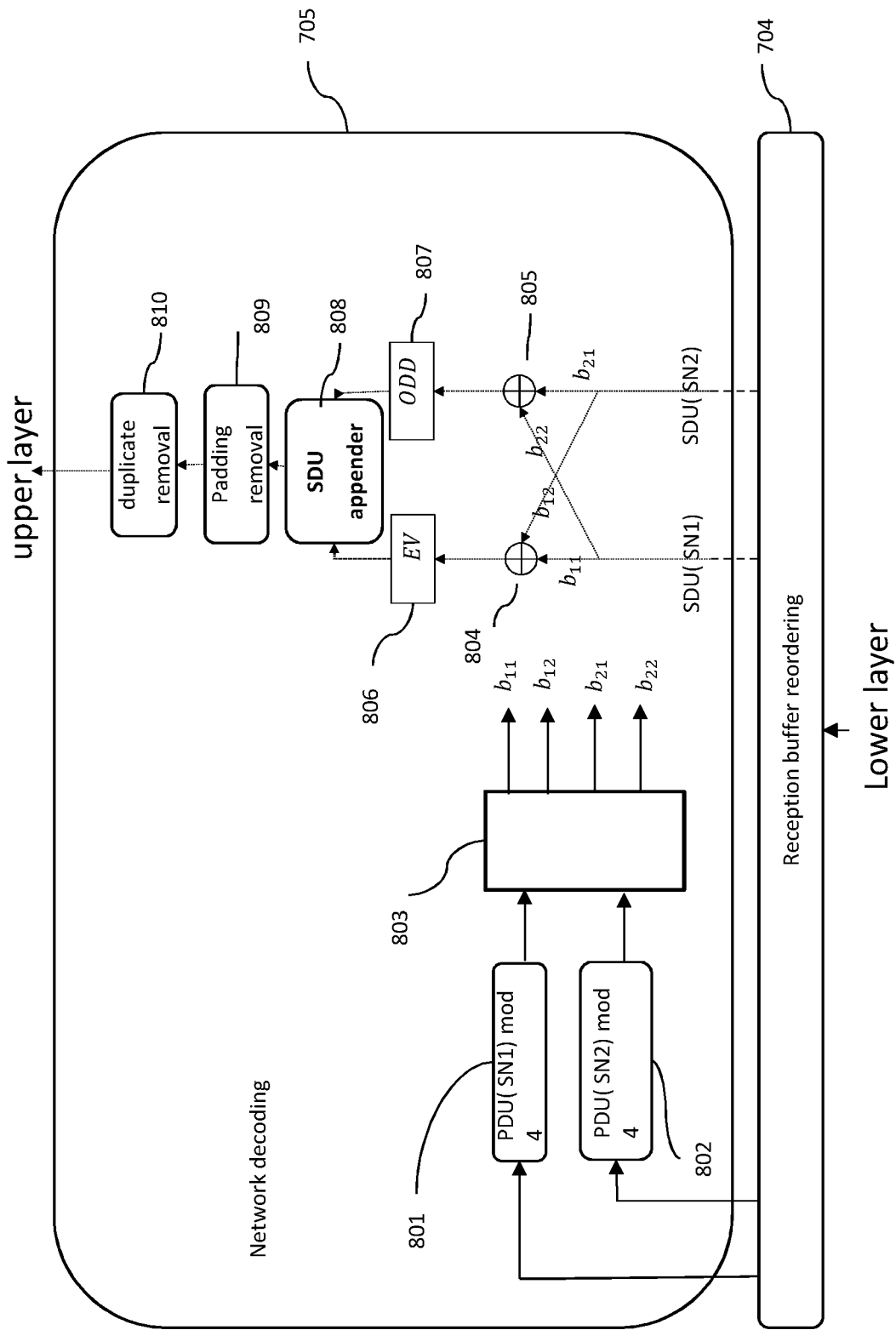
FIG. 8 illustrates the proposed Network Coding function (on the receiving side) of the method according to the present document.

The network decoding function 705 is detailed in FIG. 8.

When receiving the PDUs from the several RLC modules, the PDU deriving from the same SDU are counted to determine whether or not enough PDU have been received to retrieve the original SDU.

According to some embodiments, using the Network Coding technique with a PDU for each combined packet, it is possible to retrieve the original received SDU using n received PDUs, wherein n correspond the number of data packets obtained following the split function.

According to some embodiments, when the obtained data packets from the Network Coding are appended in several PDUs or when an obtained data packet is split over several PDU, it may be possible to retrieve the original SDU as soon as n data packets have been extracted from the received PDUs.

According to some embodiments, the counting, the determination of the linear combination used to generate the combined packet in the PDU that have been received may be stemmed from the sequence number in the header of the received PDU.

In the illustrated example, the sequence numbers are divided by 4 in order to obtain a quotient and a remainder. Thus, any received PDU sharing the same quotient k are thus derived from the same SDU, and the remainder, corresponding to the identifier of the combined data packet, may comprise information relating to the combined data packet comprised in the PDU.

According to some embodiments, the counting is made in the buffer at 704. Thus, the PDUs related to the same original SDU are decoded only if enough PDUs have been received to retrieve the initial SDU.

As explained before, the received PDUs are first reordered in the reception buffer 704. The reordering is based on the sequence number contained in the PDCP header of the received PDU.

Figure 7:
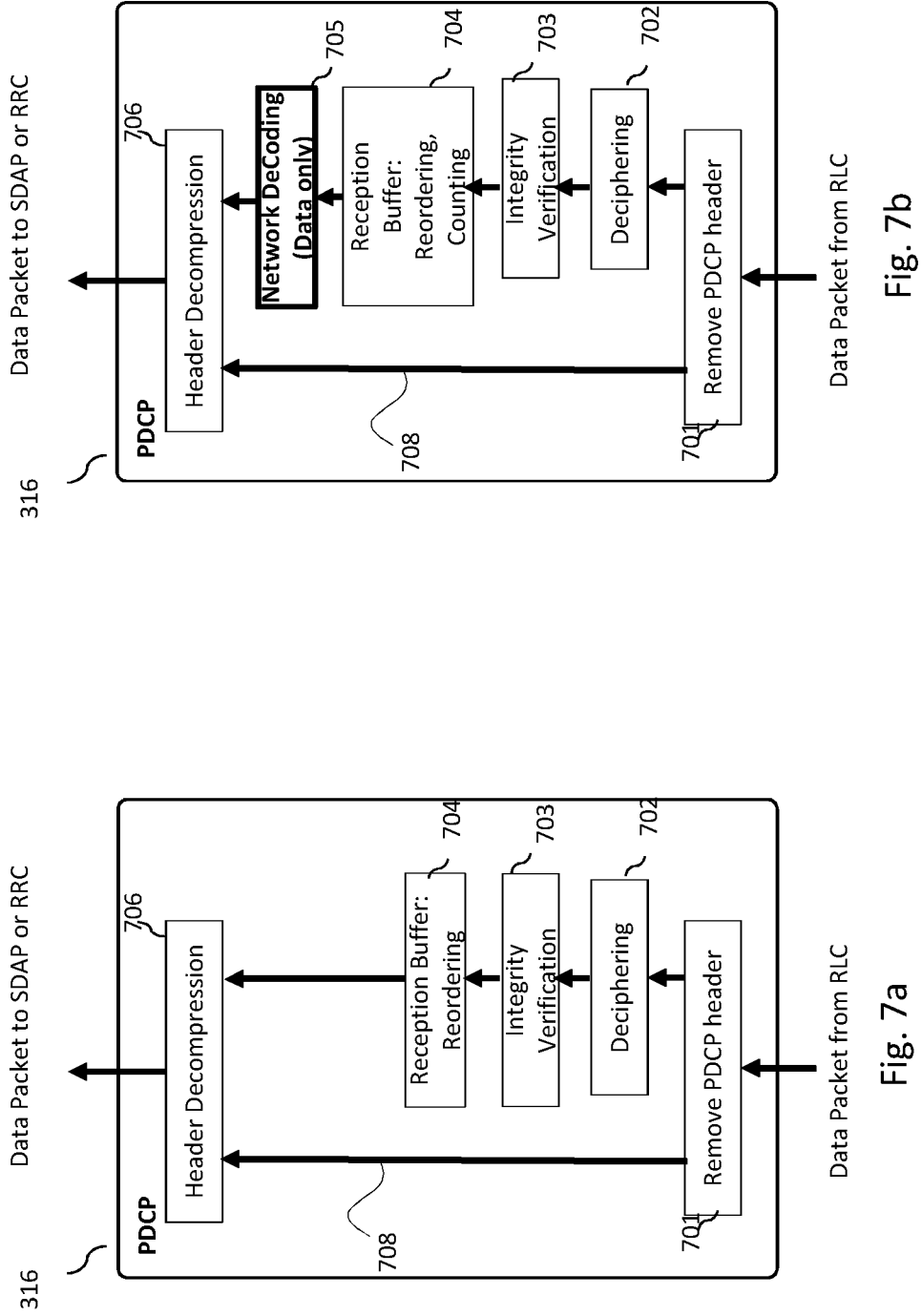
FIGS. 7a and 7b illustrate PDCP layer functions (on the receiving side) with and without the method according to the present document being implemented.

In the example of FIG. 7, only two PDUs sharing the same quotient (i.e. two among EVEN PDU, ODD PDU, COMB1 PDU, COMB2 PDU) are sufficient to reconstruct the original SDU numbered k. Thus, as soon as two PDU sharing the quotient have been received, the original SDU is retrieved using the network decoding function 705.

Once two PDUs sharing the same quotient have been received, the remainders Rem(SN1) and Rem(SN2) of these two PDUs are calculated respectively in the modules 801 and 802. According to the values of the remainders, a specific set of four coefficients ($b_{11}$, $b_{12}$, $b_{21}$ and $b_{22}$) may be retrieved to reconstruct the original SDU.

According to some embodiments, the remainder is the identifier of the combined packets, and may be retrieved by calculating the sequence number modulo 4.

According to some embodiments, the four coefficients may be calculated using the calculated remainders Rem(SN1) and Rem(SN2), i.e. the identifier of the combined data packets, and the coefficients used for the Network Coding scheme.

According to some embodiments, the four coefficients may be retrieved from a lookup table 803, as illustrated in the present example, using the calculated remainders Rem(SN1) and Rem(SN2), i.e. the identifier of the combined data packets.

Using such identifier enables coefficients to be retrieved without using additional signalling.

According to some embodiments, the set of coefficients may be retrieved directly from the header of the received PDU associated with the $k^{th}$ originally set SDU. Indeed, according to some embodiments, the header may contain information relating to the coefficient used during the Network Coding scheme of the $k^{th}$ SDU, as previously mentioned.

Then, the decoded SDU is retrieved using a set of coefficients depending on the linear combination.

In the present example, each byte of the two received PDUs are used to form a vector. Particularly, the bytes of the PDU associated with Rem(SN1), noted byte(SN1,x), and the bytes of the PDU associated with Rem(SN2), noted byte(SN2,x) form the following vector $$\begin{pmatrix} \text{byte }(SN1, x) \\ \text{byte }(SN2, x) \end{pmatrix},$$

wherein x indicates the position of the byte in the respective packets

The obtained vector is then multiplied by a matrix M resulting in the two data packets corresponding to the originally sent SDU.

The matrix $$M = \begin{pmatrix} b_{11} & b_{21} \\ b_{12} & b_{22} \end{pmatrix}$$

is determined with the specific set of four coefficients ($b_{11}$, $b_{12}$, $b_{21}$ and $b_{22}$) retrieved from the lookup table 803 (if sequence number are according to the example of FIG. 6):

1. If EVEN PDU and ODD PDU are received, the respective remainders are therefore the following: Rem(SN1)=0 and Rem(SN2)=3. The matrix M is thus the identity matrix $$\begin{pmatrix} 1 & 0 \\ 0 & 1 \end{pmatrix};$$

2. If EVEN PDU and COMB1 PDU are received, the respective remainders are therefore the following: Rem(SN1)=0 and Rem(SN2)=1. Thus, the matrix M is the invert of $$\begin{pmatrix} 1 & 0 \\ \alpha_{1,1} & \alpha_{1,2} \end{pmatrix},$$

that is $$\begin{pmatrix} 1 & 0 \\ \alpha_{1,1}/\alpha_{1,2} & 1/\alpha_{1,2} \end{pmatrix},$$

where $\alpha_{1,1}$ and $\alpha_{1,2}$ are the coefficients used by function 503 of the transmitting PDCP module, as described in FIG. 6;

3. If EVEN PDU and COMB2 PDU are received, the respective remainders are therefore the following: Rem(SN1)=0 and Rem(SN2)=2, the matrix M is the invert of $$\begin{pmatrix} 1 & 0 \\ \alpha_{2,1} & \alpha_{2,2} \end{pmatrix}$$

that is $$\begin{pmatrix} 1 & 0 \\ \alpha_{2,1}/\alpha_{2,2} & 1/\alpha_{2,2} \end{pmatrix},$$

$\alpha_{2,1}$ and $\alpha_{2,2}$ being the coefficients used by function 503 of the transmitting PDCP module, as described in FIG. 6;

4. If ODD PDU and COMB1 PDU are received, the respective remainders are therefore the following: Rem(SN1)=1 and Rem(SN2)=3. Thus, the matrix M is the invert of $$\begin{pmatrix} \alpha_{1,1} & \alpha_{1,2} \\ 0 & 1 \end{pmatrix}$$

that is $$\begin{pmatrix} 1/\alpha_{1,1} & \alpha_{1,2}/\alpha_{1,1} \\ 0 & 1 \end{pmatrix},$$

$\alpha_{1,1}$ and $\alpha_{1,2}$ being the coefficients used by function 503 of the transmitting PDCP module, as described in FIG. 6;

5. If ODD and COMB2 are received, the respective remainders are therefore the following: Rem(SN1)=2 and Rem(SN2)=3. Thus, the matrix M is the invert of $$\begin{pmatrix} \alpha_{2,1} & \alpha_{2,2} \\ 0 & 1 \end{pmatrix}$$

that is $$\begin{pmatrix} 1/\alpha_{2,1} & \alpha_{2,2}/\alpha_{2,1} \\ 0 & 1 \end{pmatrix},$$

$\alpha_{2,1}$ and $\alpha_{2,2}$ being the coefficients used by function 503 of the transmitting PDCP module, as described in FIG. 6;

6. COMB1 and COMB2 are received, the respective remainders are therefore the following: Rem(SN1)=1 and Rem(SN2)=2. Thus, the matrix M is the invert of $$\begin{pmatrix} \alpha_{1,1} & \alpha_{1,2} \\ \alpha_{2,1} & \alpha_{2,2} \end{pmatrix}$$

that is $$\frac{1}{\alpha_{1,1}\alpha_{2,2} + \alpha_{2,1}\alpha_{1,2}} \begin{pmatrix} \alpha_{2,2} & \alpha_{1,2} \\ \alpha_{2,1} & \alpha_{1,1} \end{pmatrix},$$

$\alpha_{1,2}$, $\alpha_{2,1}$ and $\alpha_{2,2}$ being the coefficients used by function 503 of the transmitting PDCP module, as described in FIG. 6;

The multiplication byte to byte of the matrix M with the vector $$\begin{pmatrix} \text{byte } (SN1, x) \\ \text{byte } (SN2, x) \end{pmatrix}$$

is illustrated in FIG. 8 with the additions 804 and 805 and the multiplicative coefficients ($b_{11}$, $b_{12}$, $b_{21}$, $b_{22}$).

The resulting packets EVEN and ODD are then stored in memory 806 and 807. Next these two packets are appended in the module 808 to reconstruct the original SDU, with its byte correctly ordered. Next, if the SDU has been padded, the padding is removed in the module 809. It should be recalled that the padding information is contained in the PCDP header of the received PDU. The module 810 removes the duplicate SDU, if the four PDUs sharing the same quotient are received.

Although the probability of the following event is very low, it may occur that only one out the four sent PDU is received. In such case, the original SDU has been lost, and a retransmission of the PDU associated with the originally sent SDU may be requested.

In this example, matrices are used for calculation purposes, but this is a non-limitative example. The decoding complexity may be reduced using coefficients to the set {0,1}, especially using matrices.

According to some embodiments, a PDU, comprising all or part of the combined data packets, is received. In this case, the concatenation scheme is known, i.e. the order in which the combined data packets are appended in the PDU. Thus, each combined data packets are extracted, using the concatenation scheme, and a new sequence number is associated. For example, when extracting the $i^{th}$ combined data packet, the new sequence number of the combined data packet is $Ith_{SN} = (SN_{unique_{PDU}} \times m) \mod z + i$. The value of i (of at least two combined data packets of the PDU) is then used to retrieve the four coefficients ($b_{11}$, $b_{12}$, $b_{21}$ and $b_{22}$) for the network decoding.

According to some embodiments, a combined data packet may be divided in several parts encapsulated in different PDU, as explained hereinbefore. In order to determine which PDUs comprising the parts deriving from the same combined data packet, the sequence number of the PDU is used: p' is calculated as p'=PDU_SN mod R, when p' is comprised between 0 and R−1, then the part is a part of the combined data packet.

More generally, the mathematical relationship between the sequence number and the identifier of the combined packet is the reverse of the function applied to generate the sequence number.

Such a method may need the PDCP header to be adapted to transport a padding information and to remove the padding (if necessary) after the decoding operation.

Figures 9A, 9B:
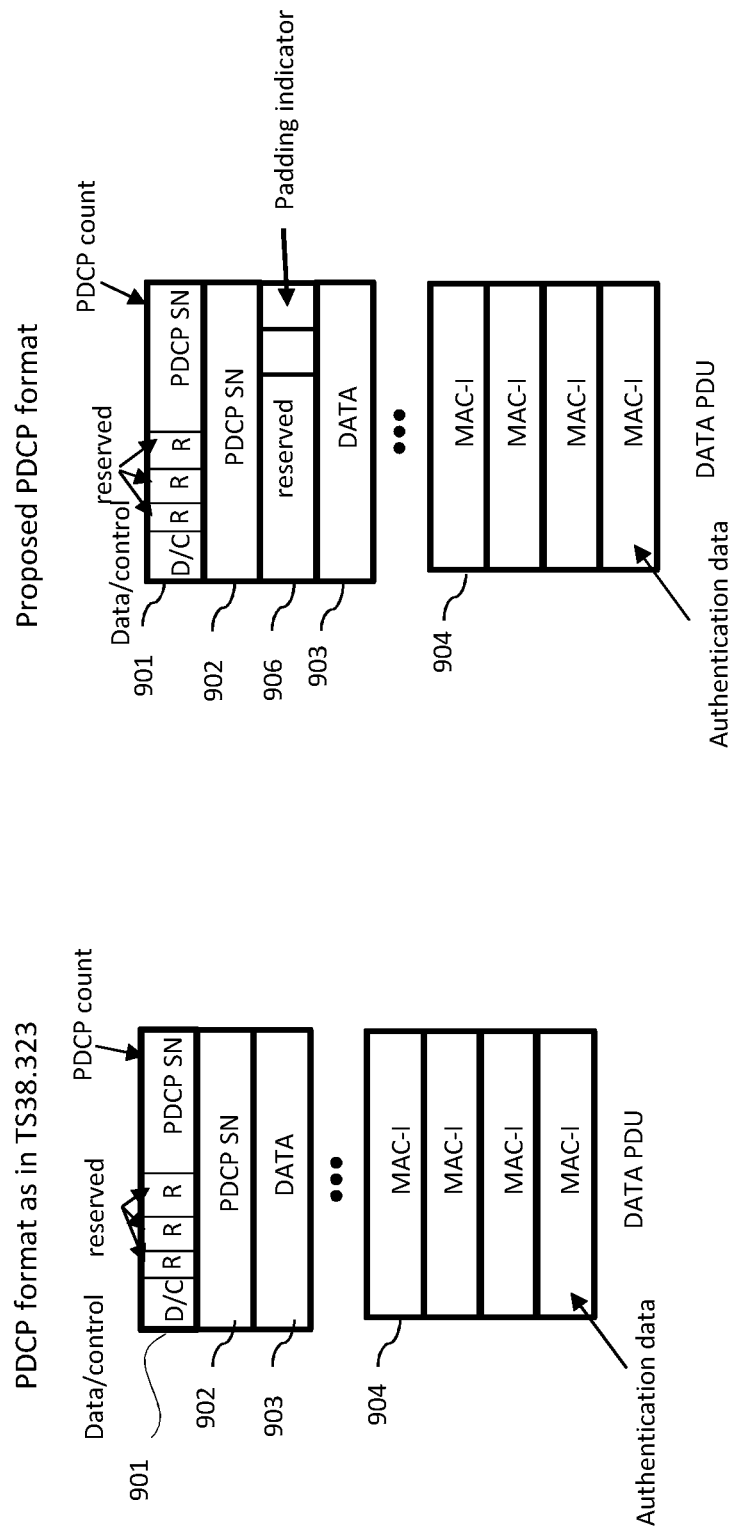
FIGS. 9a and 9b illustrate details of the PDCP formats of the prior art and of the method according to the present document (i.e. with and without Network Coding)

FIGS. 9a and 9b illustrate the format of a PDCP data packet without and with the invention. FIG. 9 illustrates the PDCP format as defined in the specification TS38.323 issued by the 3GPP organization.

The first two bytes of PDCP header are bytes 901 and 902. Byte 901 and 902 carry the following information:
One bit indicating whether the embedded information in the Data field 903 is User data or Control information.
3 bits, reserved for control packets.
12 bits indicating the sequence number that is attributed by the PDCP layer.

Trailer 904 appended after data field 903 embeds the hash information necessary for the verification of the data integrity.

FIG. 9b describes the PDCP format modified according to some embodiments of the invention.

In the header part, a third byte 906 is added. The byte 906 carries several bits indicating whether or not a padding function was used, and the number of padding bytes (i.e. the number of dummy bytes added to the data packet).

According to some embodiments, it may be further possible to indicate the padding using two bits as the following: 00 means no padding, 01 means one byte of padding, 10 means two bytes of padding, 11 means three bytes of padding).

According to some embodiments, padding may be distributed over each data packets obtained after splitting the received SDU so as the data packets have all the same size. In this case, one bit may be enough to indicate the padding.

According to some embodiments, the header may also comprise the coefficients used for the encoding using Network Coding.

According to some embodiments, the header may carry the original Sequence Number and a supplementary index that indicates the linear combination indicating whether the packet is ODD, EVEN, COMB1 or COMB2.

According to some embodiments, the header may carry in the reserved bit of byte 901 the indication that the PDU is Network Coded.

The method according to the present document requires modification in the Control Plane. In 5G communication network, UE registers to the Control Plane of a radio module of a base station. During the registration, the control plane requests the UE capability. The response is received by the radio module of the base station, stored in a memory of the base station for further purposes, and then forwarded to the Control Plane. For example, the UE capability comprises PDCP capabilities, RLC capabilities, transport channel capabilities, available physical channels, positioning. Of course, this list is non-limitative. The UE capability further includes Network Coding capability to handle the Network Coding mode. The presence of the Network Coding capability in the UE is required in order to initiate the use of the Network Coding function, but is not sufficient. The requested QoS and the link quality also contributes to initiating the Network Coding operation.

However, the Network Coding mode is not to be used automatically.

It should be reserved for ULLRC type of communication, as this type of communication, providing a short latency, should avoid retransmission mechanisms as much as possible.

Further, it may be used for links likely to have a low quality.

Besides, in a wireless communication network, it is common for the link quality to degrade when the UE enters a zone with a bad signal propagation. In such situation, the use of Network Coding would be justified.

Consequently, a way to switch to the Network Coding mode only when required is needed.

According to some embodiments, the RRC managing the data Radio Bearers, shall be adapted to the use of Network Coding.

The Radio Resource Control manages the Data Radio Bearers (including establishment, modification, suspension, resumption or release) carrying user data. The RRC protocol is used for establishing/releasing the PDCP Network Coding. To do that, a "RRCReconfiguration message is used. The RRCReconfiguration message is sent through the control plane to the UE and to the secondary base station, when applicable. The "RRC connection reconfiguration" message contains all the configurations parameters for the radio interface of the UE, Layer 1 (PHY) or Layer 2 (MAC, RLC, PDCP parameters). The UE sends a confirmation message "RRC connection reconfiguration complete" when the configuration is completed.

According to some embodiments, the RRC protocol is used, in particular the RRC configuration message. The reconfiguration message may be used to set a base station or a UE in a specific mode of transmission.

Consequently, according to some embodiments, a field is added to the RRC message to guarantee that the UE is set to operate in the Network Coding mode. In the Network Coding mode, the RRC module may ensure that the PDCP header defined in FIG. 9b is be used, and that the Network Coding modules 503 and 705 are put to operation.

According to some embodiments, the Network Coding information may be added on top of the current PDCP duplication mode.

FIG. 10 details the control fields that shall be added to the PDCP-Config field within the RRC connection configuration message.

The RRCReconfiguration message is a command to modify a RRC connection. This message may convey information for the configuration of measurements, the mobility control, the radio resource configuration (including Radio Bearers, MAC main configuration and physical channel configuration) and the Access Stratum security configuration.

Within the RRCReconfiguration message, the Information Element, i.e. part of the message handling the configuration, called RLC-BearerConfig is used to configure an RLC module, a corresponding logical channel in the MAC layer and its connection to a PDCP module.

Within the RRCReconfiguration message, the Information Element RLC-config sets the RLC modules in downlink or uplink modes.

Additionally, The Information Element CellGroupConfig is used to configure a master cell group (MCG) or secondary cell group (SCG). A cell group is composed of one MAC module, a set of logical channels with associated RLC modules. A cell group may comprise a primary cell (PCell) and one or more secondary cells (SCells).

Further, the Information Element PDCP-Config is used to set the configurable PDCP parameters for Signalling and Data Radio Bearers. It ties a PDCP module to a specific Radio Bearer. It also indicates whether the PDCP is part of a primary path and if the PDCP is attached to more than one RLC.

According to some embodiments, a pdcp-NetworkCodingConfig field may be added to the PDCP-Config Information Element. The pdcp-NetworkCodingConfig field aims at indicating whether or not the Network Coding is applied to the PDUs handled by the PDCP module.

According to some embodiments, two additional fields may be added:

NetworkCodingCoefficients: The UE shall receive the coefficients $\alpha_{nm}$ used in the encoding, in order to set-up the decoding. As the UE may be connected to several user equipment, the UE may receive the various set of coefficients used for each connection with the user equipment. As explained, hereinbefore, the coefficients may be included in the header of all the PDCP PDUs, or, in the present alternative, be included within the RRC message Information Elements. The coefficients $\alpha_{nm}$ may be described as a sequence of Octets.

NetworkCodingBearerConfig: For the same reason, it is also possible to organize which coefficients are used by the primary cell and the secondary cell. According to some embodiments, the indexes of the coefficients listed in the NetworkCodingCoefficients may be enumerated in a PrimaryCellCoefficients field. Similarly, the indexes of the coefficients listed in the NetworkCodingCoefficients may be enumerated in the SecondaryCellCoefficients field. Therefore, in this case, the identical coefficients are enumerated once, and the number of bits to code can be reduced.

According to some embodiments, the Network Coding is applied on both uplink and downlink using the same parameters.

According to some embodiments, additional fields may be used to indicated on which path the Network Coding mode is applied (downlink only, uplink only, both), and the parameters to be used for each path.

Figure 11:
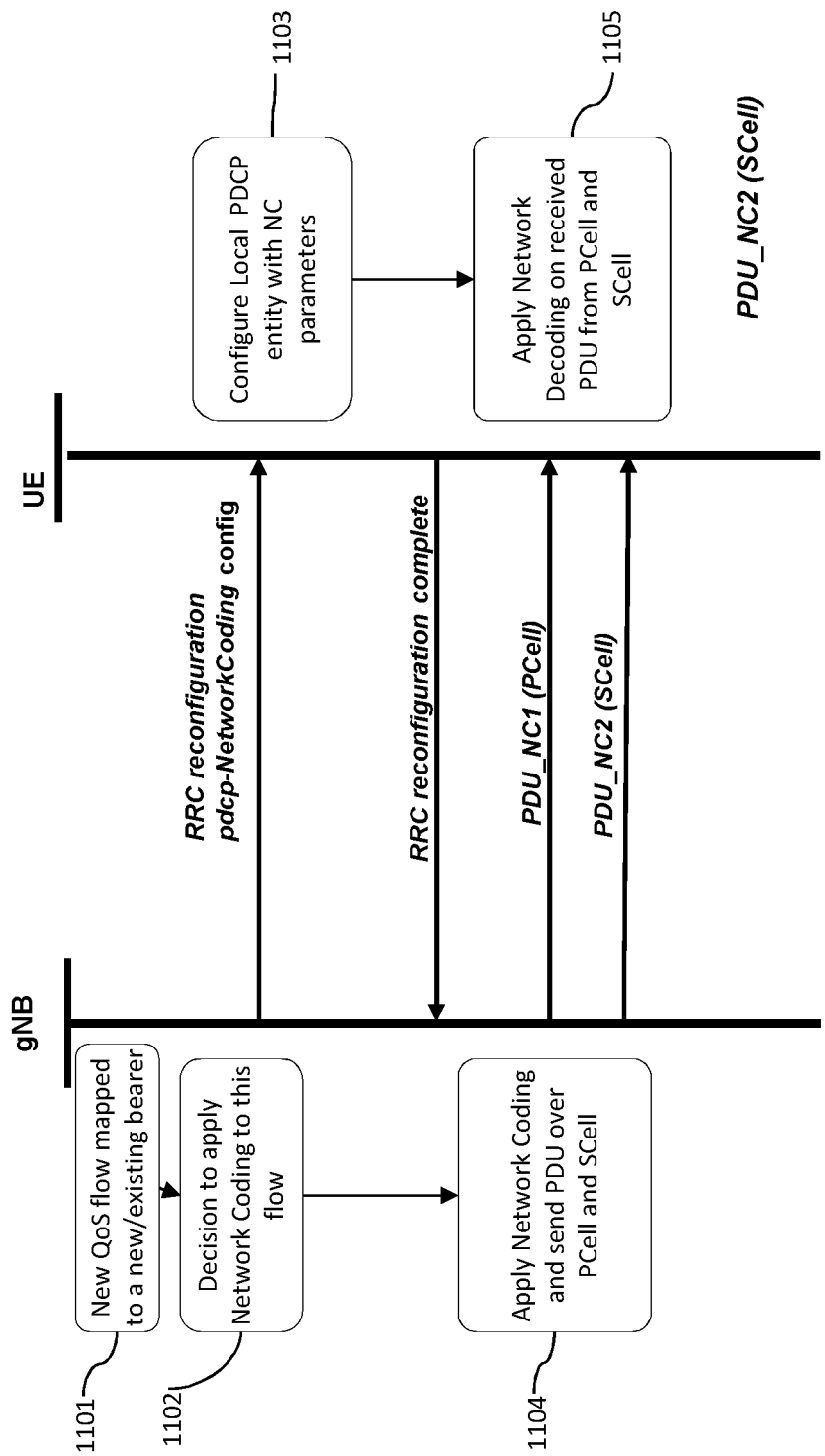
FIG. 11 is a diagram illustrating communications between a base station and a user equipment to implement Network Coding within a network topology using carrier aggregation.
Figure 12:
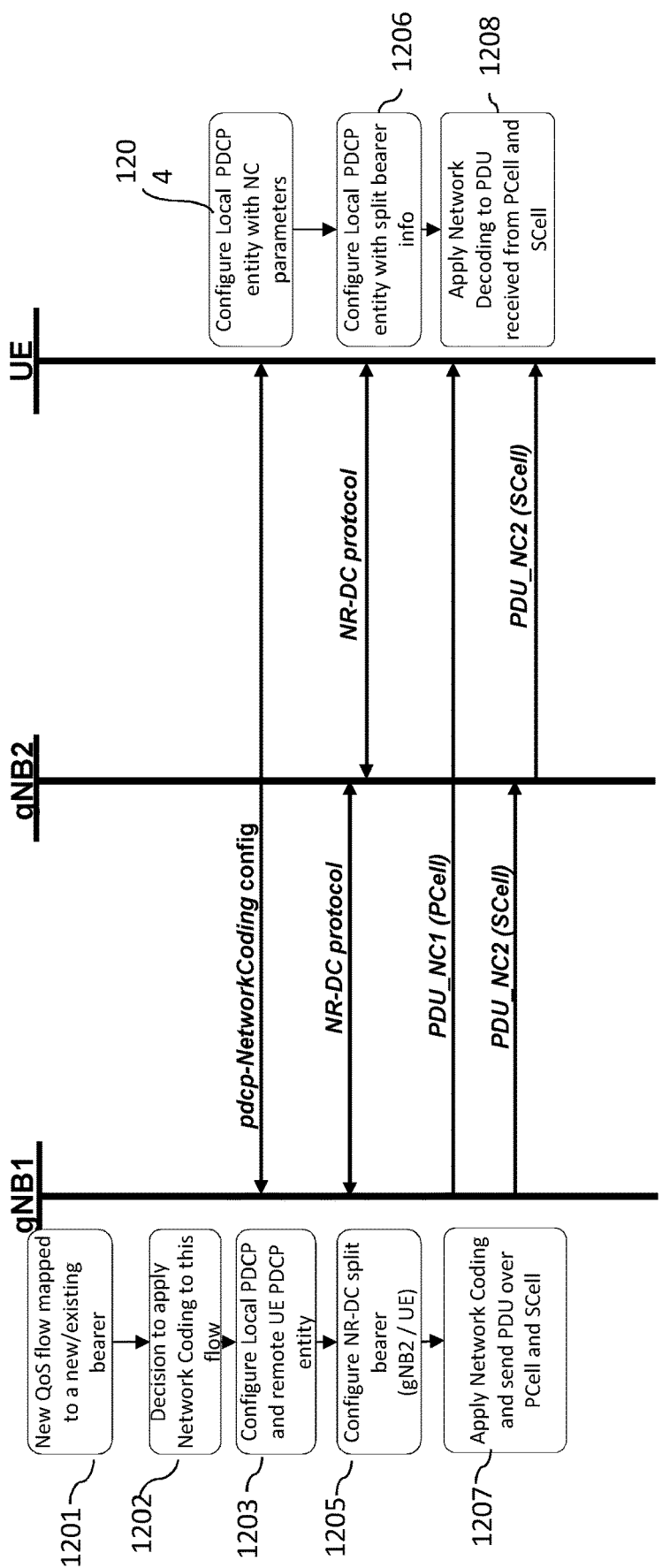
FIG. 12 illustrates a diagram illustrating communications between a base station and a user equipment to implement Network Coding within a dual connectivity network topology.

In order to better understand how the Network Coding is initiating, the message exchanges are illustrated in FIGS. 11 and 12.

FIG. 11 illustrates the Network Coding operation when the network is operating in a Carrier Aggregation network topology.

The first step 1101 is the request for the transport of a flow of data from or to an UE. The SDAP layer is configured to associate the new flow of data linked to a QoS value (QFI), to an existing data Radio Bearer or to a new Radio Bearer to be created. Next, the RRC module is configured to set up the Radio Bearer when the Radio Bearer is created.

At step 1102, the RRC module may decide or not to use the Network Coding mode depending on the requested QoS. During this step, the configuration of local PDCP module may be made. For that, an RRC message, containing the field pdcp-NetworkCoding config, is sent from the base station to the UE using the primary cell, i.e. the cell associated with the base station containing the control protocol.

On receiving this RRC message, at step 1103, the UE then configures its local PDCP module accordingly, with the Network Coding module implementing the functions described in reference to FIGS. 4b and 6b.

Upon the reception of a confirmation message from the UE to the base station, the Network Coding mode is activated, and Network Coding is applied by the base station (at step 1104) and the UE (at step 1105).

According to some embodiments, the Network Coding is applied on the downlink transmissions from the base station to the UE. Thus, in this example, the Network Coding may be applied to each PDU and the resulting combined PDU that may be sent over the Primary Cell and over the Secondary Cell from the base station to the UE. As can be seen in the FIG. 11, a first PDU, called PDU_NC1, is transmitted using the primary cell, while a second PDUs, called PDU_NC2, is transmitted using the secondary cell. Both PDU_NC1 and PDU_NC2 are thus encoded using the Network Coding scheme.

FIG. 12 illustrates the Network Coding operation when the network is operating in a Dual Connection network topology. For the sake of clarity, the set-up of the dual connectivity (NR-DC) configuration and the completion messages are not represented.

The first step 1201 is the request for the transport of a flow of data from or to an UE. The SDAP layer is configured to associate the new flow of data linked to a QoS value (QFI), to an existing data Radio Bearer or to a new Radio Bearer to be created. Next, the RRC module is configured to set up the Radio Bearer when the Radio Bearer is created.

At step 1202, the RRC may use or not the Network Coding mode depending on the requested QoS.

At step 1203, the base station configures its local PDCP module. Next, a RRC message, containing the field pdcp-NetworkCoding config, is sent from a first base station to the UE using the primary cell, i.e. the cell associated with the base station containing the control protocol.

When receiving this RRC message, at step 1204, the UE then configures its local PDCP module accordingly, with the Network Coding module implementing functions described in reference to FIGS. 4b and 6b.

Upon the reception of a confirmation message from UE to the first base station, the first base station executes the NR-DC protocol for the split bearer. Thus, using the split bearer information, the UE, at step 1206, and the second base station configure their local PDCP module.

At step 1207, the Network Coding may be applied to each PDU and sent over a primary cell from the first base station to the UE, and over a secondary cell from the first base station to the second base station to the UE.

At step 1208, the network decoding may be applied to each received PDU received over the primary and the secondary cells.

As illustrated in FIG. 12, the Network Coding is applied on the downlink transmissions from the first base station to the UE. As can be seen, a first PDU, called PDU_NC1, is transmitted on the primary cell involving the first base station, while a second PDUs, called PDU_NC2, is transmitted on the secondary cell involving the second base station. Both PDU_NC1 and PDU_NC2 are thus encoded using the Network Coding scheme.

One of the advantages of using RRC messages, is that the 4 lower layers PDCP, RLC, MAC, PHY, of the protocol stack are identical in the user plane and the control plane. Consequently, there is no modification needed at the protocol stack level in order to implement the method according to the present document.

Though the invention has been described for the case in which the data packet are transmitted over two radio link control modules, it may be easily extended to cases where the number of radio link control modules is greater than two. For this, one has to extend the number of encoding vectors per leg to the number of legs, and the dimension of the decoding matrices to the number of legs.

Figure 13:
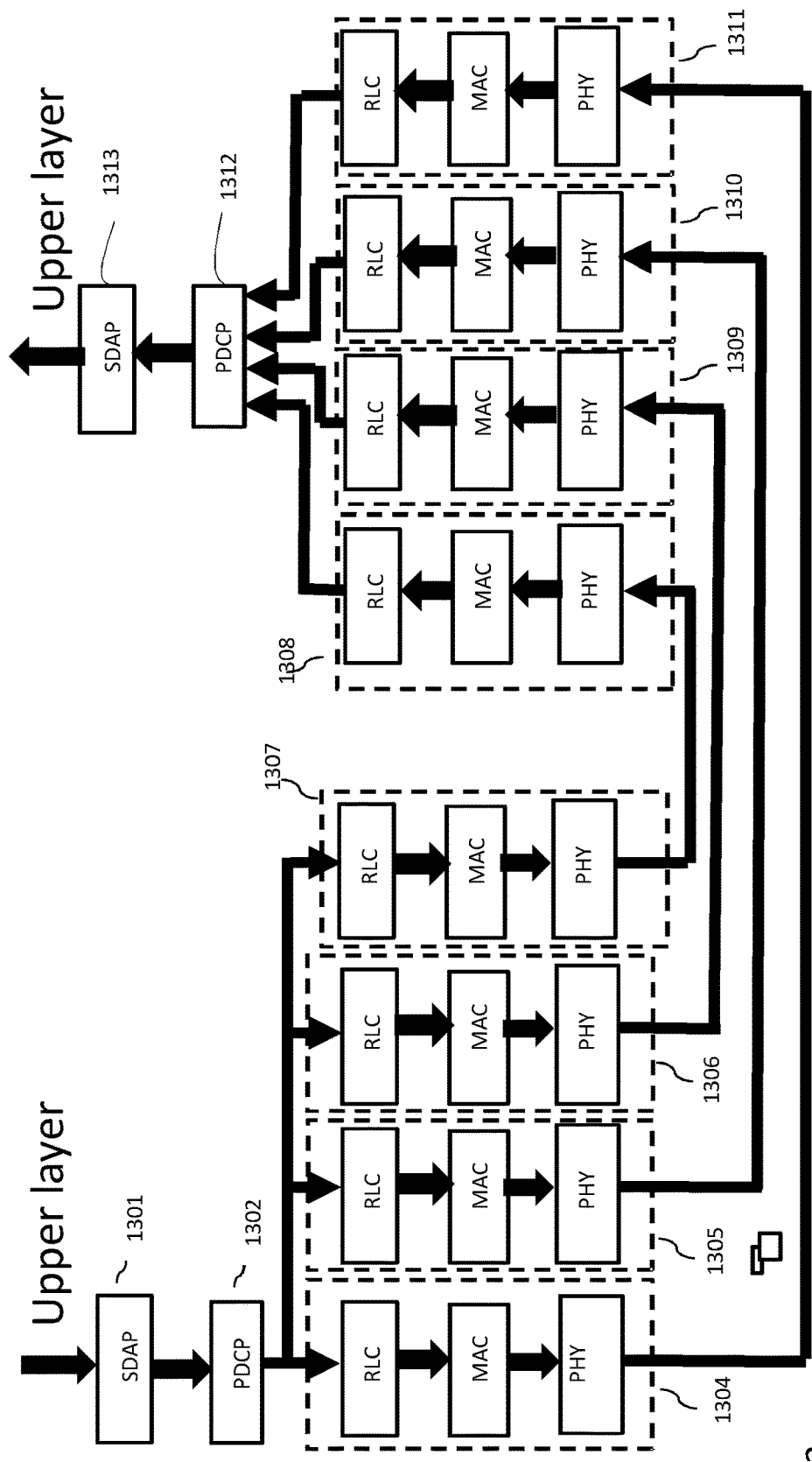
FIG. 13 illustrates the protocol stack during a multiple connectivity within a network.

FIG. 13 illustrates the protocol stack when data transmission is done over four RLC modules. In other words, in this case the transmission may be made with a primary cell, and three secondary cells.

Up to four RLC legs are allowed out of the PDCP layer, each leg being then routed to different cells. Using that much RLC module (and legs) provide an excellent reliability.

As can be seen on FIG. 13, the protocol stack has identical elements to that presented in FIGS. 3 and 4.

On the transmitting side, the SDAP module 1301 that receives a flow of data, then associate the flow of data either with an existing or a new Data Radio Bearer to be created. The SDAP module 1301 then sends the data packet to the PDCP module 1302, tasked with the duplication.

The output of the PDCP module is directed to four different sets of RLC, MAC and PHY functions, 1304, 1305, 1306 and 1307. According to some embodiments, these sets may be implemented inside the same base station, or inside four different base stations.

On the receiving side, the receiving equipment shall have 4 different radio elements for reception. Similarly, to the transmitting side, there are four sets of RLC, MAC and PHY modules 1308, 1309, 1310 and 1311.

Each of the sets 1308, 1309, 1310 and 1311 may transmit the received packets to a common PDCP module. The PDCP module is configured to eliminate the possible duplicated packets, reorder the packets and pass them to a SDAP module. The SDAP module is configured to remove the encapsulation that was added by the SDAP on the transmitting side.

Figure 14:
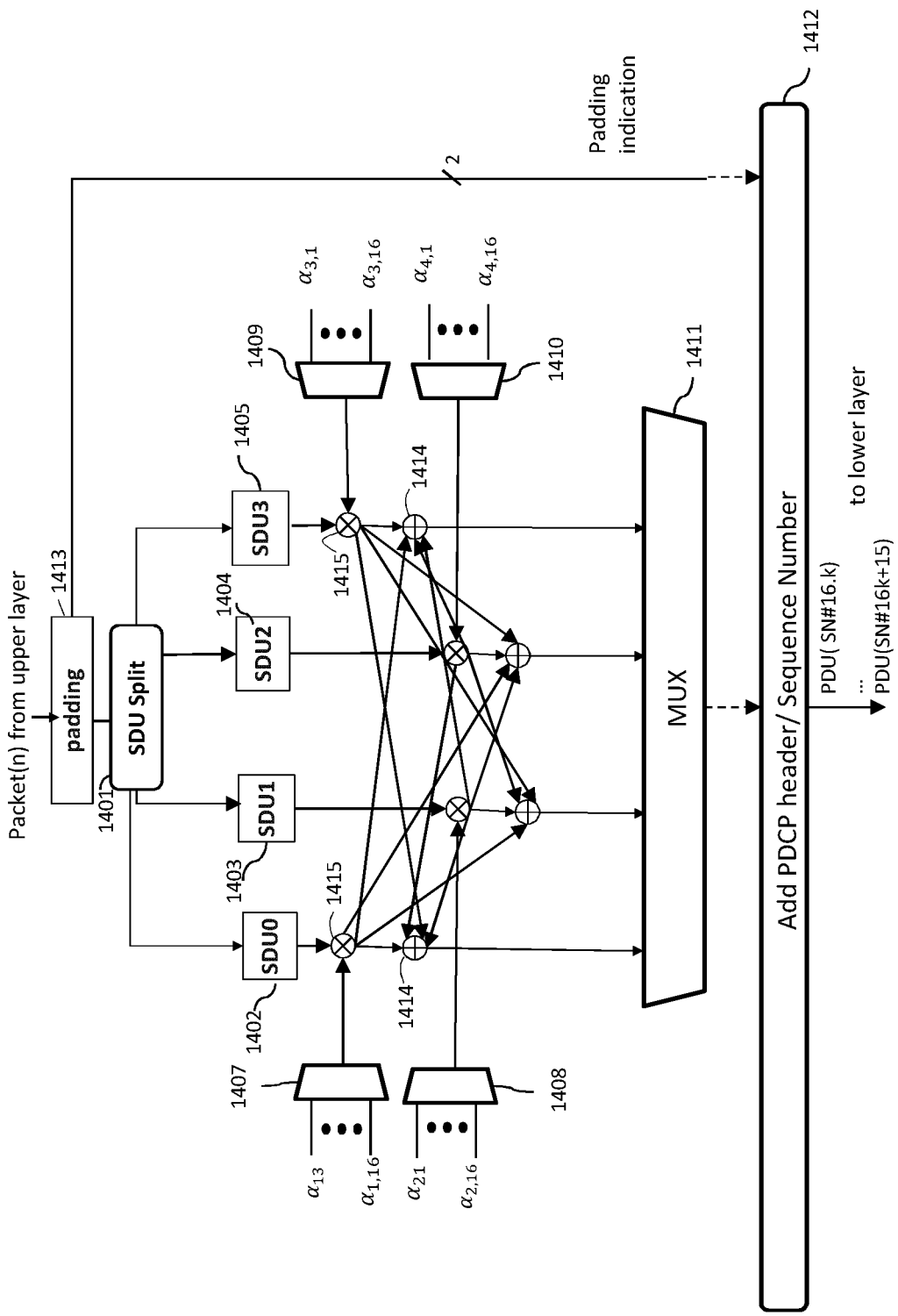
FIG. 14 illustrates the proposed Network Coding function (on the transmitting side) of the method according to the present document when implemented within a multiple connectivity network topology.

When transmitting over four RLC modules, the Network Coding may be adapted accordingly, as illustrated in FIG. 14.

FIG. 14 describes an example of Network Coding function, which may be used when data transmission is made over four RLC modules of the duplication mechanism. In this example, when the $k^{th}$ incoming SDU is received, it is first handled by the padding function 1413.

When the SDU length is a multiple of 4 (this is an example, it is not linked to the number of RLC modules), the SDU may be split into four equal part without padding being needed. When the SDU length in bytes is not a multiple of 4, the SDU may be padded such that up to 3 bytes may be appended to the SDU.

The information regarding the padding or the non-padding of the SDU is communicating to the function 1412 where the PDCP header is added so as to obtain PDU to be transmitted.

Then, the SDU is handled by the SDU splitter function. This function splits the packet in up to 4 parts.

According to some embodiments, the splitter function may consist in placing the (SDU_length/4) first bytes in the first packet, and placing the following bytes in the second, third and fourth packets. Of course, this is a non-limitative example.

According to some embodiments, the padding may be present in only one of the data packets obtained after the splitter function.

According to some embodiments, padding may be carried out after the splitting of the received SDU. As an illustration, a SDU having a length about 4×t−3 may be split into 3 packets of t−1 bytes and 1 packet of t bytes. Thereby, one byte of padding is appended to each packet of n−1 bytes. Such an embodiment has the advantage to limit the size of the padding indication in the PDCP header. Indeed, as the padding size remains equal to one byte, the padding indication may only indicate if the SDU has been padded or not.

Next, through the multiplexer 1411, up to 16 PDUs may be output.

According to some embodiments, the combined packets which are the results of the addition byte to byte of the result of byte to byte multiplications by four different coefficients $\alpha_{1,m}$, $\alpha_{2,m}$, $\alpha_{3,m}$, $\alpha_{4,m}$, of the bytes within the different packets at the same position. The operations are made in the Galois Field GF256.

As can be seen on FIG. 14, the addition and the multiplication are respectively indicated by the symbols 1414 and 1415.

To create 16 combined data packets, 64 coefficients are required, provided by four multiplexers 1407, 1408, 1409 and 1410.

The combined packets are then encapsulated so as to obtain 16 (for example) PDUs, and are numbered with a sequence number of the form 16k+t, t belonging to the set {0, . . . , 15}.

Thus, in this example, if the probability of loss of the channels is about 0.1, then the probability of not receiving all 16 PDUs is $(0.1)^{16}$. Further, the probability of not receiving at least four PDUs required to reconstruct the original SDU is about $(0.1)^{12}$. Therefore, it may not be necessary to send more than 4 to 8 combined packets to obtain a sufficient packet loss ratio.

According to some embodiments, the Network Coding function as illustrated in FIG. 6 may also be used when the data transmission is carried out over four RLC modules of the duplication mechanism.

Figure 15:
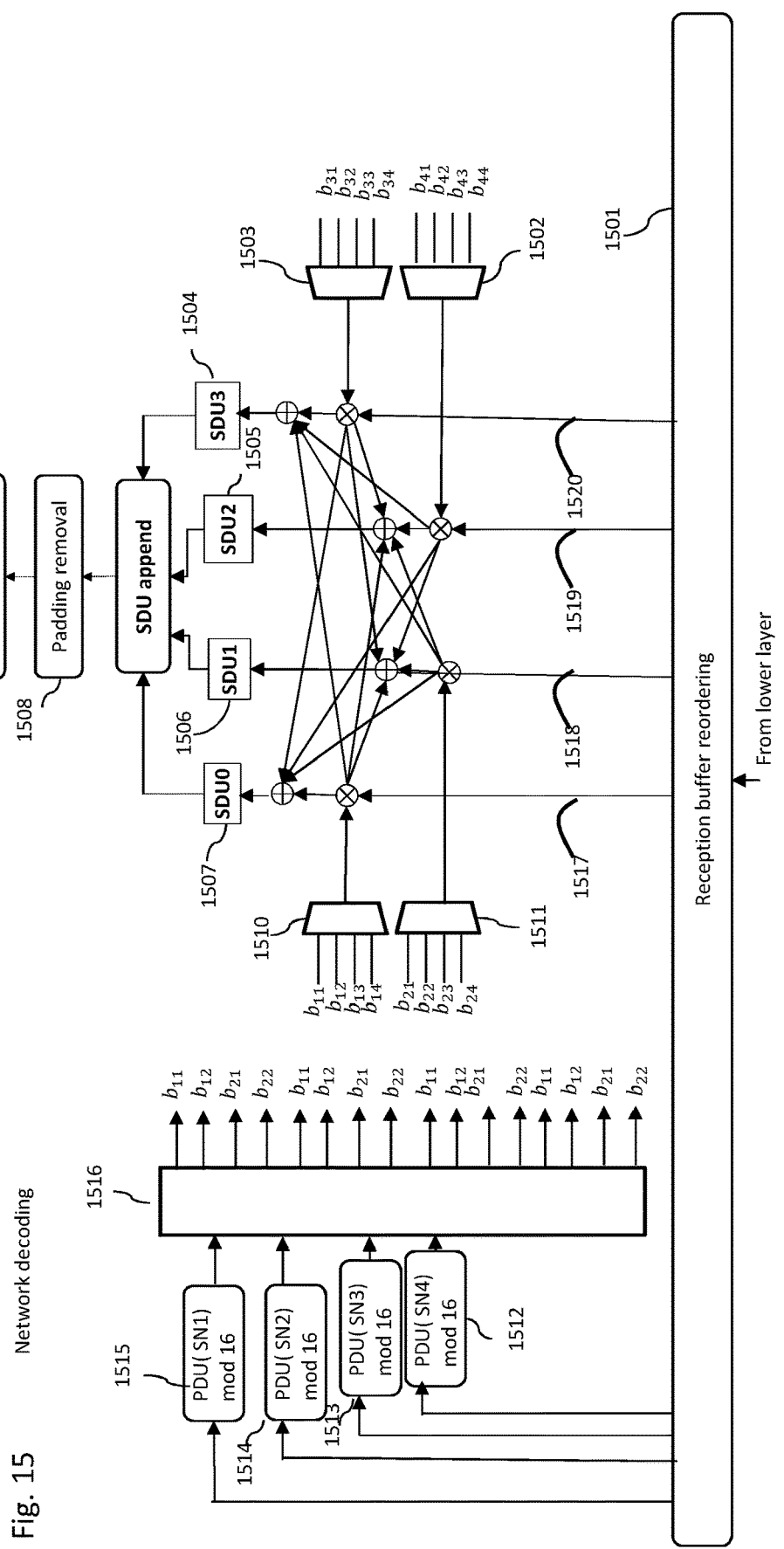
FIG. 15 illustrates the proposed Network Coding function (on the transmitting side) of the method according to the present document when implemented within a multiple connectivity network topology.

FIG. 15 illustrates an example Network decoding function implemented at the PDCP layer, in the receiving side, when data transmission is carried out over four RLC modules.

As explained hereinbefore, in order to determine the combined packets issued from the $k^{th}$ received SDU in the transmitting side, the sequence number is divided by 16. Any sequence number retrieved from the PDCP header of a received PDU divided by 16 gives a quotient and a remainder. Thus, the all the PDUs sharing the same quotient k are issued from the same $k^{th}$ received SDU in the transmitting side.

Thus, after the at least four received PDUs sharing the same quotient are extracted and reordered, the 16 required coefficients of the decoding matrix are obtained. The coefficients required to retrieve the original SDU may be chosen as a function of the remainders of the at least four received PDU.

The remainders of the respective sequence numbers (SN1, SN2, SN3, SN4) of the at least first, second, third and fourth PDUs, sharing the same quotient, are then calculated at 1512, 1513, 1514, 1515.

According to some embodiments, the calculated remainders are used to retrieve the associated coefficients in a lookup table 1516. The lookup table 1516 comprises the invert matrices of the 4×4 matrix constituted by the coefficients $\alpha_{1,m}$, $\alpha_{2,m}$, $\alpha_{3,m}$, $\alpha_{4,m}$, associated with the 4 received PDUs. The multiplexers 1502, 1503, 1510 and 1511 comprise the coefficients of the inverts of all the possible 4×4 matrices. These coefficients are then multiplied by the elements of the incoming data packets 1517, 1518, 1519, 1520 and the results are added.

Four packets are recreated, called respectively SDU0 to SDU3 and are stored in 1504 to 1507. The original SDU is then reconstructed in module 1508, by appending the 4 recreated packets and by applying the reverse method of splitting that was use in the PDCP layer on the transmitting side. When applicable, the padding is removed at 1508.

According to some embodiments, the module 1509 removes the duplicated SDU, in the case when all the PDUs sharing the same quotient are received.

Figure 16:
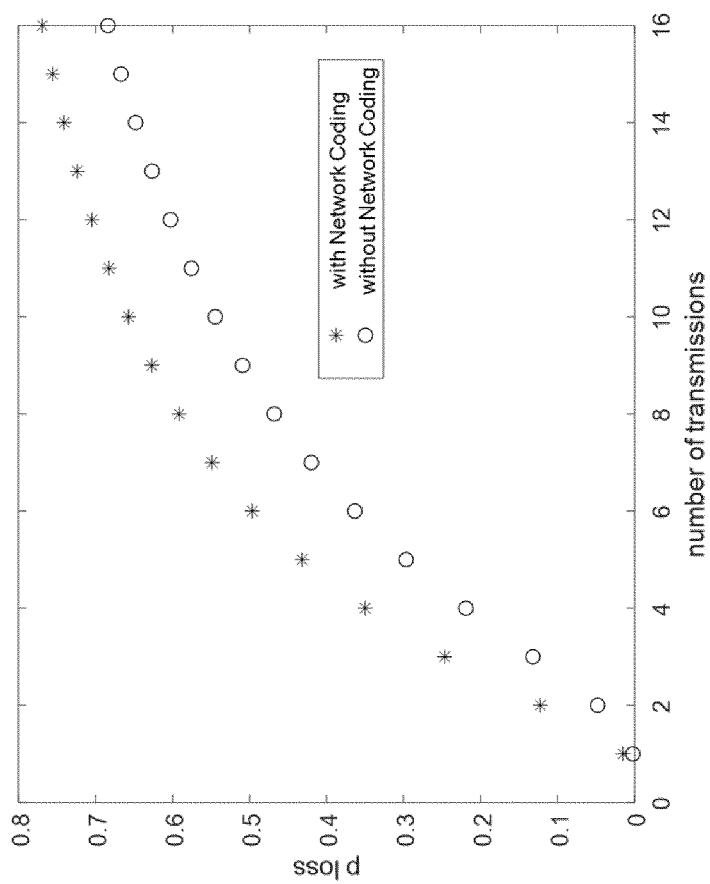
FIG. 16 illustrates the packet loss ratio of two legs, each associated with a RLC module, as a function of the number of transmissions with and without the method according to the present document.
Figure 17:
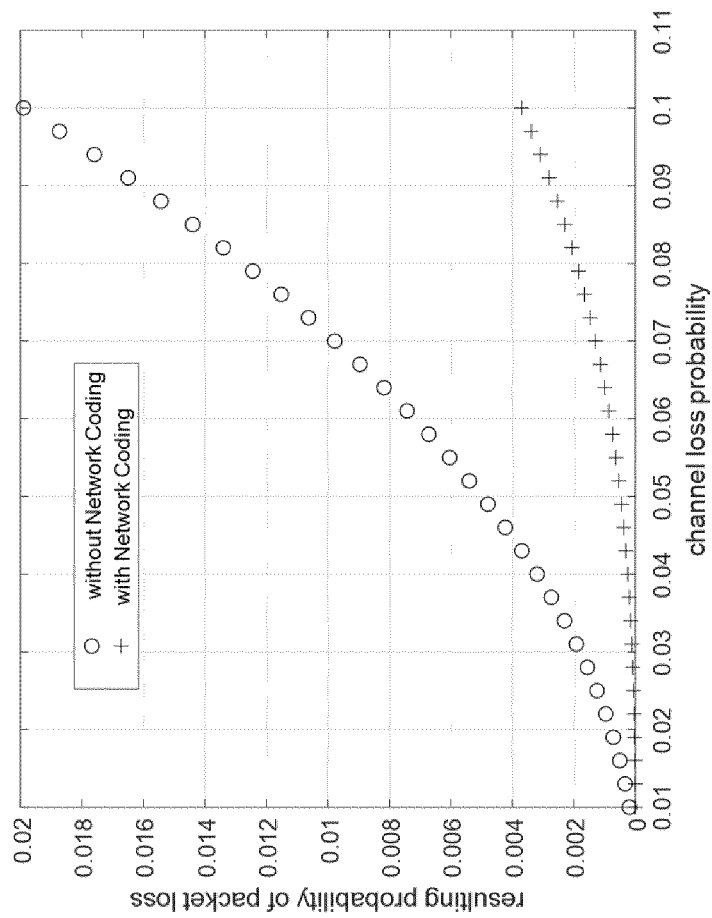
FIG. 17 illustrates the probability of packet loss as a function of the channel loss probability with and without the method according to the present document.

FIGS. 16 and 17 illustrate the results of using a method of transmission according to the present document.

FIG. 16 first illustrates the effect of using the scheme of the transmission method of the present document. A gain is observed compared to the PDCP duplication scheme as previously known.

Take as an example of the duplication scheme as previously known, the case where two packets PKT1 and PKT2 are sent over two legs, respectively associated with a different RLC module. Let P1 be the probability of loss on the first leg, and P2 be the probability of loss on the second leg, the probability of loss is then determined with the following 7 events:

TABLE 1

| | Leg 1 | Probability Leg1 | Leg 2 | Probability Leg2 |
|---|---|---|---|---|
| 1 | PKT1 received, PKT2 lost | (1-P1) · P1 | No packet received | $P2^2$ |
| 2 | PKT1 lost, PKT2 received | (1-P1) · P1 | No packet received | $P2^2$ |
| 3 | No packet received | $P1^2$ | PKT1 received, PKT2 lost | (1-P2) · P2 |
| 4 | No packet received | $P1^2$ | PKT1 lost, PKT2 received | (1-P2) · P2 |
| 5 | No packet received | $P1^2$ | No packet received | $P2^2$ |
| 6 | PKT1 received, PKT2 lost | (1-P1) · P1 | PKT1 received, PKT2 lost | (1-P2) · P2 |
| 7 | PKT1 lost, PKT2 received | (1-P1) · P1 | PKT1 lost, PKT2 received | (1-P2) · P2 |

The probability of failure of the data transmission is the sum of the seven combined probabilities (meaning the probability of failure of the data transmission of the first leg and the second leg).

This highlights the defect of the duplication scheme: indeed, the diversity is limited, and the probability of simultaneous loss in the two legs may reasonably happen. Using redundancy with a limited diversity is thus a weak solution to correct transmission errors or PDU losses.

The use of Network Coding enables the creation of a kind of diversity.

Let's take the example where a PKT1 and a Combination 1 (a first linear combination of PKT1 and PKT2) are sent over one leg, PKT2 and Combination 2 (a second linear combination of PKT1 and PKT2) are sent over the second leg.

Let P1 be the probability of loss on the first leg, and P2 be the probability of loss on the second leg, the probability of loss is then determined with the following 5 events:

TABLE 2

| | Leg 1 | Probability Leg1 | Leg 2 | Probability Leg2 |
|---|---|---|---|---|
| 1 | PKT1 received, combination 1 lost | (1-P1) · P1 | No packet received | $P2^2$ |
| 2 | No packet received | $P1^2$ | PKT2 received, combination 2 lost | (1-P2) · P2 |
| 3 | PKT1 lost, combination 1 received | (1-P1) · P1 | No packet received | $P2^2$ |
| 4 | No packet received | $P1^2$ | PKT2 lost, combination 2 received | (1-P2) · P2 |
| 5 | No packet received | $P1^2$ | No packet received | $P2^2$ |

The probability of failure of the data transmission is the sum of the five combined probabilities (meaning the probability of failure of the data transmission of the first leg and the second leg). As there are fewer events resulting in transmission failure, the Network Coding scheme has therefore a better packet loss ratio.

For the sake of illustration, using a same packet loss probability on the two legs equal to $10^{-5}$ in this example, the probability of loss of channel may be calculated. Therefore, the number of required retransmission may be determined.

FIG. 16 illustrates the packet loss ratio as a function of required retransmission, using or not the transmission method according to the present invention.

To avoid retransmissions (i.e. when the transmission number is equal to 1), with or without the transmission method according to the present document, the channel packet loss should be below 0.0023 (i.e. 2.3 per thousand) without the proposed Network Coding scheme.

With the proposed network scheme, the channel packet loss can reach upon 0.015 (i.e. 1.5%). These values are compatible with 5G NR networks which are compatible with probability loss on channels below 10%. Thus, the proposed scheme enables a packet to be received in less than two transmissions. This make it possible to ensure that an acceptable packet loss under $10^{-5}$ and a latency under 1 ms.

As can be seen on FIG. 17, the resulting probability of packet loss when duplication scheme is used is expressed as a function of the channel loss probability for the two legs, with or without the proposed transmission method according to this document.

As can be seen, when the probability of loss of the channel is null, both scheme are equivalent. However, it can be observed that for a channel probability of 0.1 (i.e. 10%), the resulting probability of packet loss is only of 0.0037 (i.e. 3.7 per thousand) with the transmission method according to the present document in spite of 0.02 (i.e. 2%) without.

This confirms that the probability of packet loss is considerably reduced.

The invention claimed is:

1. A method of wireless transmission of protocol data units over one or more radio link modules, the method comprising:
   splitting a service data unit, received from an upper layer, into a plurality of data packets;
   encoding the data packets by applying Network Coding in order to obtain combined data packets, each combined data packet being associated with an identifier linked to the applied Network Coding;
   encapsulating the combined data packets into protocol data units, wherein each protocol data unit comprises a header comprising a sequence number associated with the protocol data unit;
   transmitting the protocol data units over the one or more radio link modules, and
   wherein the sequence number and the identifier are linked by a predetermined function.

2. The method according to claim 1, wherein the predetermined function is transmitted over the one or more radio link modules.

3. A method of wireless reception of protocol data units, the method comprises:
   receiving protocol data units from one or more radio link modules, wherein each protocol data unit comprises a header comprising a sequence number associated with the protocol data unit;
   de-encapsulating, from the received protocol data units, combined data packets obtained by applying a Network Coding at an encoder, wherein each combined data packet is associated with an identifier linked to the applied Network Coding, and wherein the sequence number and the identifier are linked by a function shared with the encoder;
   obtaining identifiers of the combined data packets based on the shared function and the sequence numbers associated with the protocol data units;
   obtaining data packets by applying Network Decoding on the combined data packets identified by the obtained associated identifiers, and
   reconstructing a decoded service data unit from the obtained data packets.

4. The method according to claim 3, wherein a set of coefficients for Network Decoding is retrieved from a lookup table using the identifiers of the combined data packets.

5. An apparatus for wireless communication, comprising a processor configured to perform:
   splitting a service data unit, received from an upper layer, into a plurality of data packets;
   encoding the data packets by applying Network Coding in order to obtain combined data packets, each combined data packet being associated with an identifier linked to the applied Network Coding;
   encapsulating the combined data packets into protocol data units, wherein each protocol data unit comprises a header comprising a sequence number associated with the protocol data unit; and
   transmitting the protocol data units over one or more radio link modules,
   wherein the sequence number and the identifier are linked by a predetermined function.

6. An apparatus for wireless communication, comprising a processor configured to perform:
   receiving protocol data units from one or more radio link modules, wherein each protocol data unit comprises a header comprising a sequence number associated with the protocol data unit;
   de-encapsulating, from the received protocol data units, combined data packets obtained by applying a Network Coding at an encoder, wherein each combined data packet is associated with an identifier linked to the applied Network Coding, and wherein the sequence number and the identifier are linked by a function shared with the encoder;
   obtaining identifiers of the combined data packets based on the sequence numbers associated with the protocol data units and the shared function;
   obtaining data packets by applying Network Decoding on the combined data packets identified by the obtained associated identifiers, and
   reconstructing a decoded service data unit from the obtained data packets.

* * * * *